US009203514B2

(12) United States Patent
Deguchi et al.

(10) Patent No.: US 9,203,514 B2
(45) Date of Patent: Dec. 1, 2015

(54) TRANSMISSION SYSTEM, TRANSMITTER AND RECEIVER

(71) Applicant: KABUSHIKI KAISHA TOSHIBA, Minato-ku, Tokyo (JP)

(72) Inventors: Jun Deguchi, Kawasaki (JP); Hideaki Majima, Tokyo (JP); Toshiyuki Yamagishi, Tokyo (JP); Nau Ozaki, Kawasaki (JP); Ichiro Seto, Tokyo (JP); Koji Horisaki, Yokohama (JP); Masahiro Sekiya, Tokyo (JP); Hideki Yamada, Kawasaki (JP); Yuki Fujimura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 305 days.

(21) Appl. No.: 13/781,155

(22) Filed: Feb. 28, 2013

(65) Prior Publication Data
US 2013/0272717 A1  Oct. 17, 2013

(30) Foreign Application Priority Data

Apr. 13, 2012  (JP) ................. 2012-092471

(51) Int. Cl.
*H04B 10/00* (2013.01)
*H04B 10/116* (2013.01)

(52) U.S. Cl.
CPC .................. *H04B 10/116* (2013.01)

(58) Field of Classification Search
CPC ................................. H04B 10/116
USPC ....................................... 398/154
See application file for complete search history.

(56) References Cited

U.S. PATENT DOCUMENTS

| | | | |
|---|---|---|---|
| 4,809,257 A * | 2/1989 | Gantenbein et al. | 398/128 |
| 5,305,092 A * | 4/1994 | Mimura et al. | 356/609 |
| 5,914,981 A * | 6/1999 | Veintimilla | 375/145 |
| 7,308,194 B2 | 12/2007 | Iizuka et al. | |
| 7,715,723 B2 * | 5/2010 | Kagawa et al. | 398/131 |
| 8,248,467 B1 | 8/2012 | Ganick et al. | |
| 8,565,607 B2 * | 10/2013 | Kang et al. | 398/128 |

(Continued)

OTHER PUBLICATIONS

Md. Shakowat Zaman Sarker et al.: "A CMOS Imager and 2-D Light Pulse Receiver Array for Spatial Optical Communication": IEEE Asian Solid-State Circuits Conference: Nov. 16-18, 2009: Taipei, Taiwan 16 pp. 113-116 (in English).

(Continued)

*Primary Examiner* — Ken Vanderpuye
*Assistant Examiner* — Abbas H Alagheband
(74) *Attorney, Agent, or Firm* — Holtz, Holtz, Goodman & Chick PC

(57) ABSTRACT

According to one embodiment, a transmission system includes a transmitter and a receiver. The transmitter includes a modulator configured to modulate transmission data at a chip rate to generate a modulation signal, and one or a plurality of light sources configured to emit visible light according to the modulation signal. The receiver includes a light receiver having one or more lines of light receiving elements to receive light in a first range including the visible light; and a demodulator configured to demodulate image data generated according to the light received by the light receiver to generate reception data corresponding to the transmission data. A following equation is satisfied ff<fm where fm is the chip rate, and ff is a frame rate of the light receiver.

20 Claims, 25 Drawing Sheets

(56) References Cited

U.S. PATENT DOCUMENTS

| | | | |
|---|---|---|---|
| 8,576,146 B2* | 11/2013 | Park et al. | 345/76 |
| 8,957,951 B1* | 2/2015 | Ganick et al. | 348/61 |
| 2004/0066363 A1* | 4/2004 | Yamano et al. | 345/98 |
| 2005/0163201 A1* | 7/2005 | Krasner | 375/150 |
| 2006/0056855 A1* | 3/2006 | Nakagawa et al. | 398/183 |
| 2008/0044188 A1* | 2/2008 | Kagawa et al. | 398/128 |
| 2011/0109782 A1* | 5/2011 | Park et al. | 348/333.01 |
| 2011/0217044 A1* | 9/2011 | Kang et al. | 398/67 |
| 2012/0155889 A1* | 6/2012 | Kim et al. | 398/193 |
| 2014/0307157 A1* | 10/2014 | Oshima et al. | 348/362 |
| 2014/0321859 A1* | 10/2014 | Guo et al. | 398/118 |

OTHER PUBLICATIONS

Shinya Itoh et al.: A CMOS Image Sensor for 10Mb/s 70m-Range LED Based Spatial Optical Communication: 2010 IEEE International Solid-State Circuits Conference: pp. 402-404 (in English).

* cited by examiner

Dr = 01

Manchester coding

| Barker 5 | 1 | 1 | 1 | 0 | 1 | | | | | | | | |
|---|---|---|---|---|---|---|---|---|---|---|---|---|---|
| Barker 7 | 1 | 1 | 1 | 0 | 0 | 1 | 0 | | | | | | |
| Barker 11 | 1 | 1 | 1 | 0 | 0 | 0 | 1 | 0 | 0 | 1 | 0 | | |
| Barker 13 | 1 | 1 | 1 | 1 | 1 | 0 | 0 | 1 | 1 | 0 | 1 | 0 | 1 |

Case : A

Case : B (S1 = S0)

TRANSMISSION SYSTEM, TRANSMITTER AND RECEIVER

CROSS REFERENCE TO RELATED APPLICATIONS

This application is based upon and claims the benefit of priority from the prior Japanese Patent Application No. 2012-092471, filed on Apr. 13, 2012, the entire contents of which are incorporated herein by reference.

FIELD

Embodiments described herein relate generally to a transmission system, a transmitter and a receiver.

BACKGROUND

A system is known where visible light on which data are superposed is transmitted from a transmitter to a receiver. The transmitter blinks a light source such as a light emitting diode (LED) which emits a visible light according to the data to be transmitted. The receiver receives the data by photographing and demodulating the visible light emitted from the light source by using a photo diode (PD) or an image sensor. Particularly, in a receiver using the image sensor, since the light source needs to be recognized on the sensor during the reception period, it is preferable to implement the previewing over the entire angle of viewing at the same time of the reception in order to improve usability.

In the transmission system, by setting the frequency of the light source of the transmitter to be high so that the blinking of the light source is not perceived, information can be transmitted without disturbing normal illumination or general operations of a display. On the other hand, since a low power and low cost receiver is desired, it is preferable that the frame rate of the receiver is low. In general, it is difficult for a receiver having a low frame rate to perceive blinking of the light source at a high frequency.

In order to improve an effective frame rate, a manner of accessing only a portion of the area which can be photographed by the receiver can be considered. However, since a peripheral portion of the light source is not accessed, there is a problem in that previewing over the entire angle of viewing cannot be performed. In this case, it is difficult to find the position of the light source or to handle a plurality of the light sources. On the other hand, if an image sensor having a specialized structure is used in order to perform previewing, there is a problem of an increase in costs of implementation.

DETAILED DESCRIPTION

In general, according to one embodiment, a transmission system includes a transmitter and a receiver. The transmitter includes a modulator configured to modulate transmission data at a chip rate to generate a modulation signal, and one or a plurality of light sources configured to emit visible light according to the modulation signal. The receiver includes a light receiver having one or more lines of light receiving elements to receive light in a first range including the visible light; and a demodulator configured to demodulate image data generated according to the light received by the light receiver to generate reception data corresponding to the transmission data. A following equation is satisfied ff<fm where fm is the chip rate, and ff is a frame rate of the light receiver.

Embodiments will now be explained with reference to the accompanying drawings.

Figure 1:
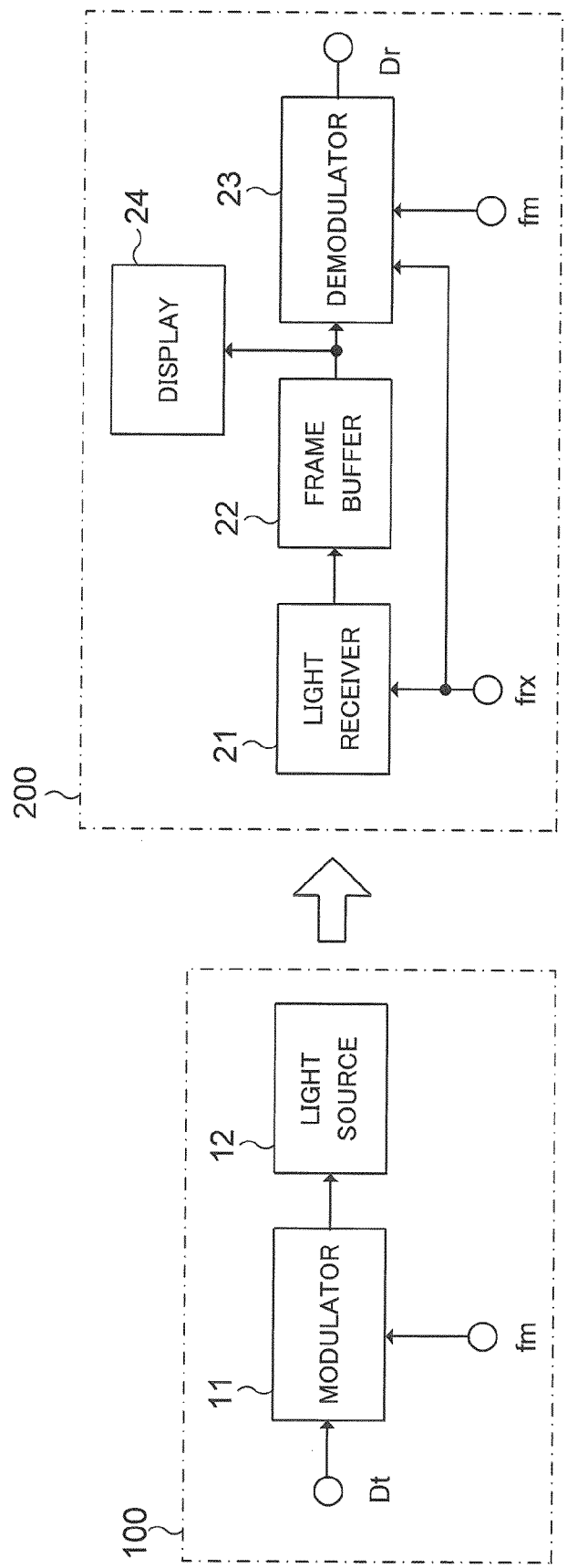
FIG. 1 is a block diagram illustrating a schematic configuration of a transmission system according to a first embodiment.

FIG. 1 is a block diagram illustrating a schematic configuration of a transmission system according to a first embodiment. The transmission system includes a transmitter 100 and a receiver 200.

The transmitter 100 includes a modulator 11 and a light source 12. The modulator 11 modulates transmission data Dt and supplies a modulation signal to the light source 12. The light source 12 is, for example, an LED and emits visible light according to the modulation signal. In other words, the transmission data Dt is superposed on the visible light. The light source 12 may be a light source of an illumination apparatus or a backlight of a liquid crystal display or the like. In addition, although one light source 12 is illustrated in the figure, the receiver 200 may include a plurality of the light sources 12.

The receiver 200 includes a light receiver 21, a frame buffer 22, a demodulator 23, and a display 24. The light receiver 21 is an image sensor such as a CCD camera or CMOS sensor. The light receiver 21 light-receives (photographs) a visible light emitted by the light source 12 and light in a neighboring range of the visible light. The frame buffer 22 generates image data from luminance information of the light which is light-received and photo-electrically converted by the light receiver 21 and retains the generated image data. The demodulator 23 demodulates the image data to generate reception data Dr corresponding to the transmission data Dt. The display 24 displays an image corresponding to the entire angle of viewing of the image data. The image corresponding to the entire angle of viewing of the image data may be an appropriately-resized image of the image data.

Figure 2:
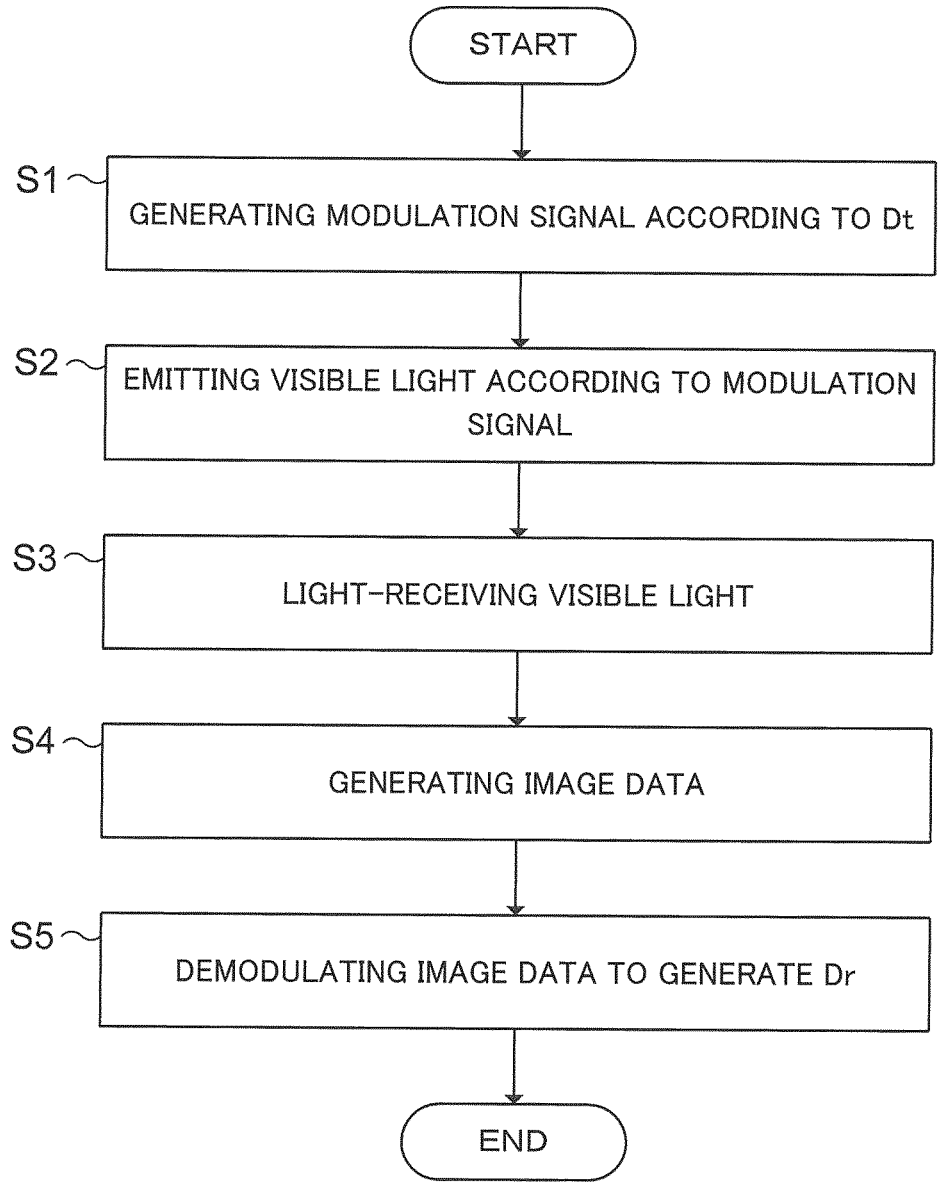
FIG. 2 is a flowchart illustrating an example of processing operations of the transmission system according to the first embodiment.

FIG. 2 is a flowchart illustrating an example of processing operations of the transmission system according to the first embodiment. First, the modulator 11 of the transmitter 100 modulates the transmission data Dt to generate the modulation signal (Step S1). Next, the light source 12 emits visible light according to the modulation signal (Step S2). Next, the light receiver 21 of the receiver 200 light-receives the visible light (Step S3). Next, the frame buffer 22 generates image data according to the light-received light beam (Step S4). In addition, the demodulator 23 demodulates the image data to generate the reception data Dr (Step S5). Then, if necessary, the display 24 displays the image data. Hereinafter, processing operations of each component will be described in detail.

Figure 3A:
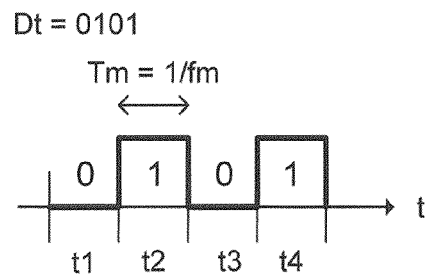
FIGS. 3A and 3B are diagrams illustrating operations of the transmitter 100.
Figure 3B:
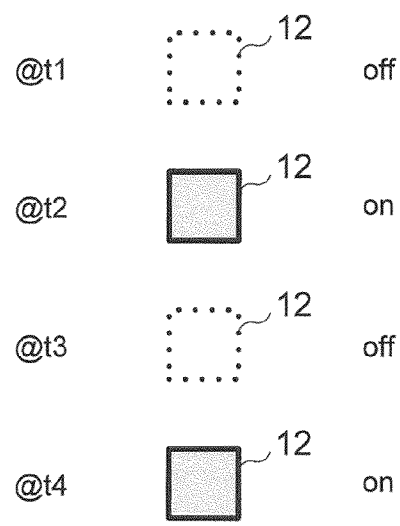

FIGS. 3A and 3B are diagrams illustrating operations of the transmitter 100. The figure illustrates an example where the transmission data Dt="0101". As illustrated in FIG. 3A, the modulator 11 sets the modulation signal to be low at time t1, high at time t2, low at time t3, and high at time t4 according to the transmission data Dt. A difference time between the time t1 and t2 is a unit time of blinking control of the light source, and herein, is defined as a chip time "Tm". In addition, a reciprocal number thereof is defined as a chip rate "fm". In addition, hereinafter, as illustrated in FIG. 3B, when the modulation signal is high, the light source 12 is turned on; and when the modulation signal is low, the light source 12 is turned off.

It is preferable for the modulator 11 to generate the modulation signal so that the blinking of the light source 12 is not to be recognized by human eyes. Therefore, the chip rate fm is set to be somewhat high, for example, 100 Hz or more.

Figure 4:
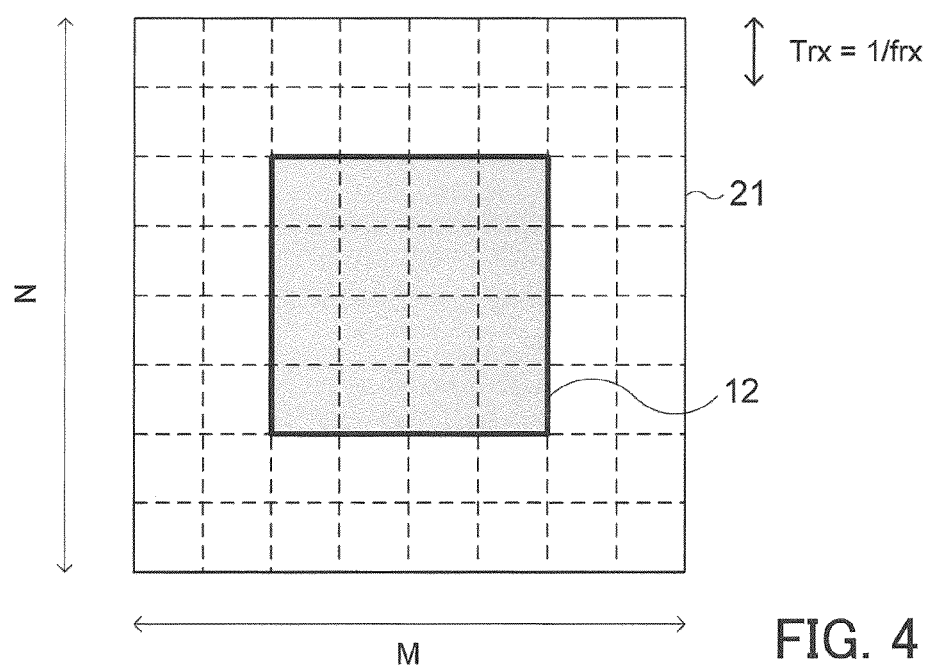
FIG. 4 is a schematic diagram illustrating the light receiver 21 of the receiver 200.

FIG. 4 is a schematic diagram illustrating the light receiver 21 of the receiver 200. The light receiver 21 includes a plurality of light receiving elements (image sensor pixels) which are arranged in a matrix shape. More specifically, N light receiving elements are arranged in the vertical direction which is a scanning direction, and M light receiving elements are arranged in the horizontal direction perpendicular to the scanning direction (N and M are integers of 1 or more). Then, a time interval between the starting of scanning (light-receiving, photographing) of one line and the starting of scanning of the next line is defined by a line scan period "Trx", the line being composed of the M light receiving elements arranged in the horizontal direction; and a line scan frequency is denoted by "frx" (=1/Trx). Herein, the minimum value of a period of accessing the same line of the light receiver 21 is defined by a frame period "Tf"; and a frame rate is denoted by "ff" (=1/Tf). For example, in the receiver 200, the frame rate ff is almost frx/N (=1/(N*Trx)) and for example, 30 fps (frame per second) or 60 fps.

Herein, as one of features of the embodiment, the chip rate fm and the frame rate ff satisfy the following equation (1).

$$ff<fm \tag{1}$$

Hereinafter, for simplifying the description, it is assumed that the number of light receiving elements of the light receiver 21 is 8×8 (N=M=8) and 4×4 central light receiving elements light-receive the visible light emitted by the light source 12.

FIGS. 5A to 5D are schematic diagrams illustrating operations of the light receiver 21, and correspond to FIGS. 3 and 4. It is assumed that, at time t1 to t4, the third to sixth lines 31 to 34 of the light receiver 21 perform photographing, respectively. In addition, the figure illustrates an example where (chip rate fm)=(line scan frequency frx).

As illustrated in FIG. 5(a), at the time t1, since the light source 12 is turned off, the light source 12 is not photographed by the third line 31 of the light receiver 21. As illustrated in FIG. 5(b), at the time t2, since the light source 12 is turned on, a portion of the light source 12 corresponding to the position of the fourth line 32 of the light receiver 21 is photographed. Similarly, at the time t3, the light source 12 is not photographed (FIG. 5(c)); and at the time t4, a portion of the light source 12 is photographed (FIG. 5(d)). Note that, particularly, although not illustrated, the first and second lines are photographed before the time t1; and the seventh and eighth lines are photographed after the time t4.

Figure 5:
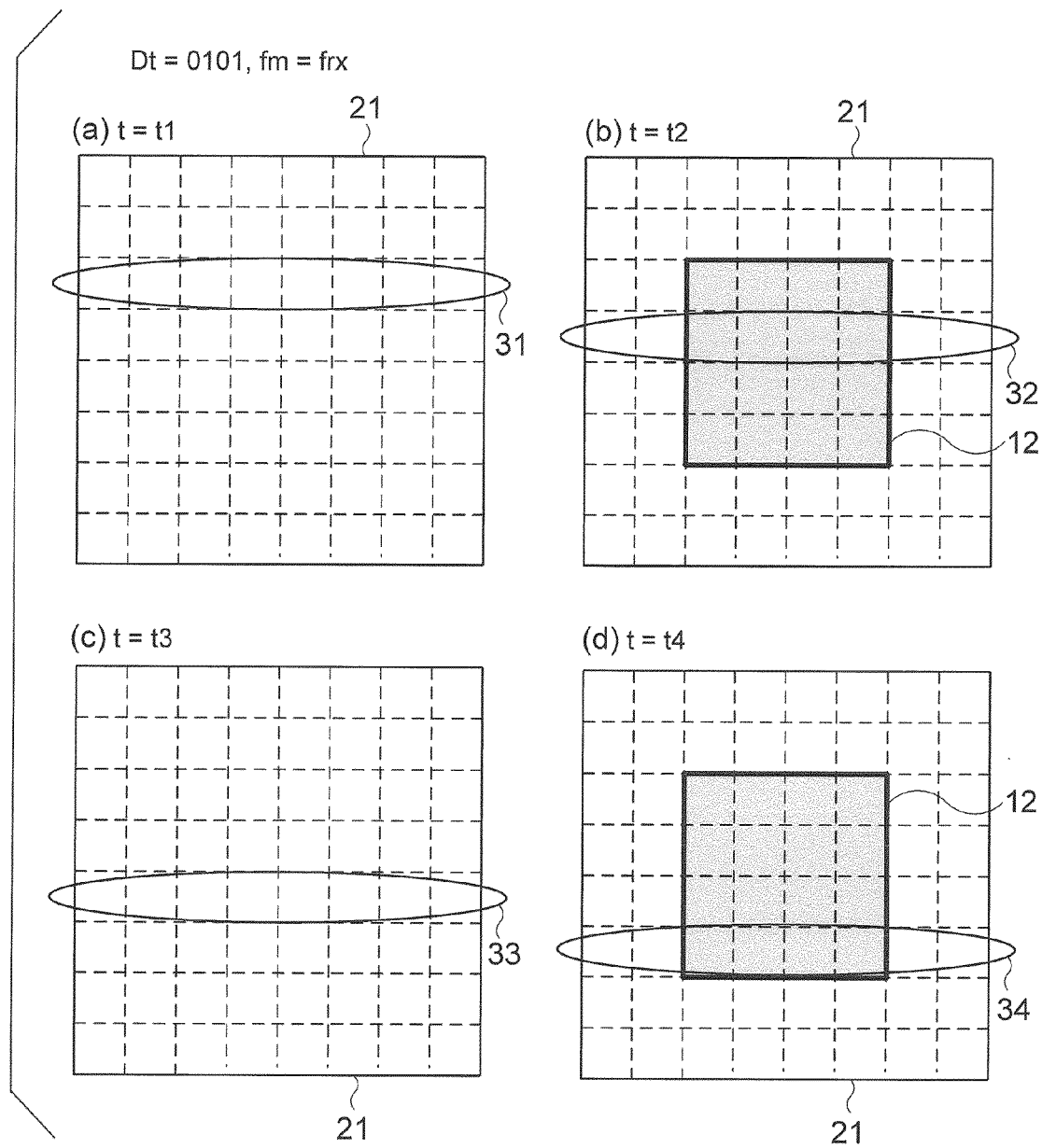
FIG. 5 is a schematic diagram illustrating operations of the light receiver 21.
Figure 6:
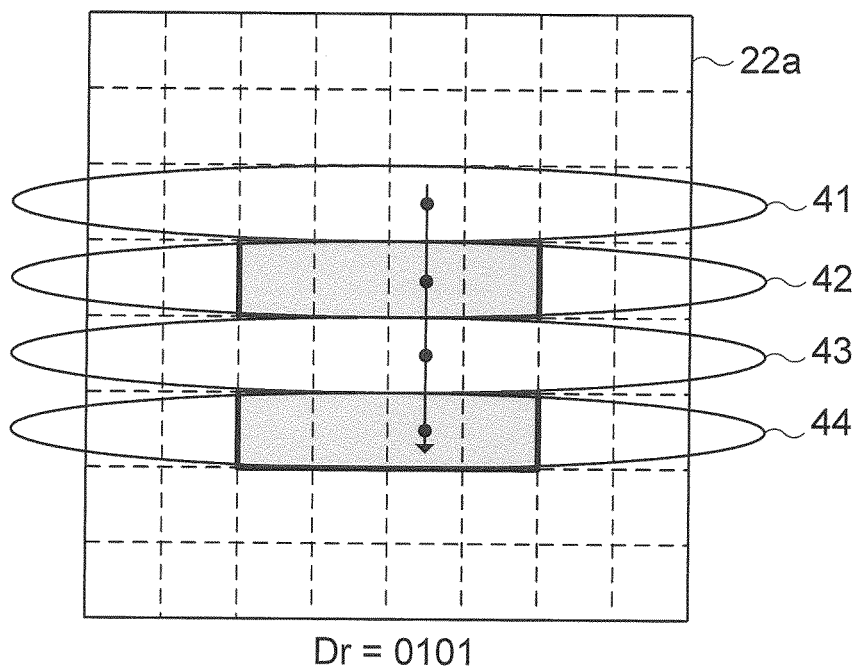
FIG. 6 is a diagram illustrating image data 22a which is generated by the frame buffer 22 based on a photographing result of the light receiver 21 of FIG. 5.

FIG. 6 is a diagram illustrating image data 22a which is generated by the frame buffer 22 based on a photographing result of the light receiver 21 of FIG. 5. Each pixel of the image data 22a corresponds to each light receiving element of the light receiver 21 one-to-one. Therefore, the image data 22a are composed of N scan lines, each of the scan line including M pixels.

As illustrated in the figure, a portion of the light source 12 appears in the fourth scan line 42 corresponding to the fourth line 32 of the light receiver 21 photographed at the time t2 and the sixth scan line 44 corresponding to the sixth line 34 of the light receiver 21 photographed at the time t4, and however, light source 12 does not appear in the third scan line 41 corresponding to the third line 31 of the light receiver 21 photographed at the time t1 and the fifth scan line 43 corresponding to the fifth line 33 of the light receiver 21 photographed at the time t3.

The image data 22a of FIG. 6 are displayed on the display 24. Therefore, in the embodiment, not only the light source 12, but also the entire angle of viewing photographed by the light receiver 21 can be previewed.

In addition, FIG. 6 illustrates processing operations of the demodulator 23. In the embodiment, it is assumed that an area corresponding to the light source 12 in the image data 22a, that is, a position and size photographed by the light source 12 is known. In FIG. 6, since fm=frx, the demodulator 23 samples the luminance of each scan line in the area corresponding to the light source 12. Next, the demodulator 23 combines the sampled values to generate the reception data Dr. More specifically, the sampled values of the scan lines 41 to 44 are 0 (dark), 1 (bright), 0 (dark), and 1 (bright), respectively. The combination "0101" thereof is the reception data Dr. In this manner, the reception data Dt which are equivalent to the transmission data Dt of FIG. 3 can be obtained by the receiver 200.

In the above example, fm=frx. However, if the above equation (1) is satisfied, the chip rate fm may be lower than the line scan frequency frx. With respect to a case where fm=frx/2, the difference from FIGS. 3 to 6 will be mainly described.

Figure 7:
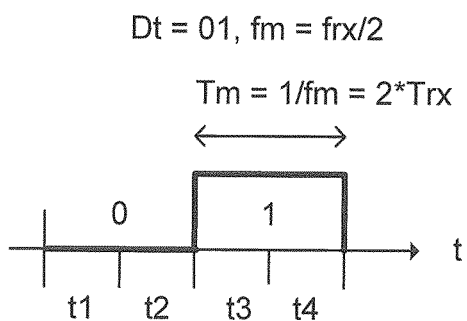
FIG. 7 is a diagram illustrating an example of a modulation signal in the case where fm=frx/2 as an example where the transmission data Dt="01".

FIG. 7 is a diagram illustrating an example of a modulation signal in the case where fm=frx/2 as an example where the transmission data Dt="01". The chip time of the transmission data Dt is expressed by Tm=2*Trx.

Figure 8:
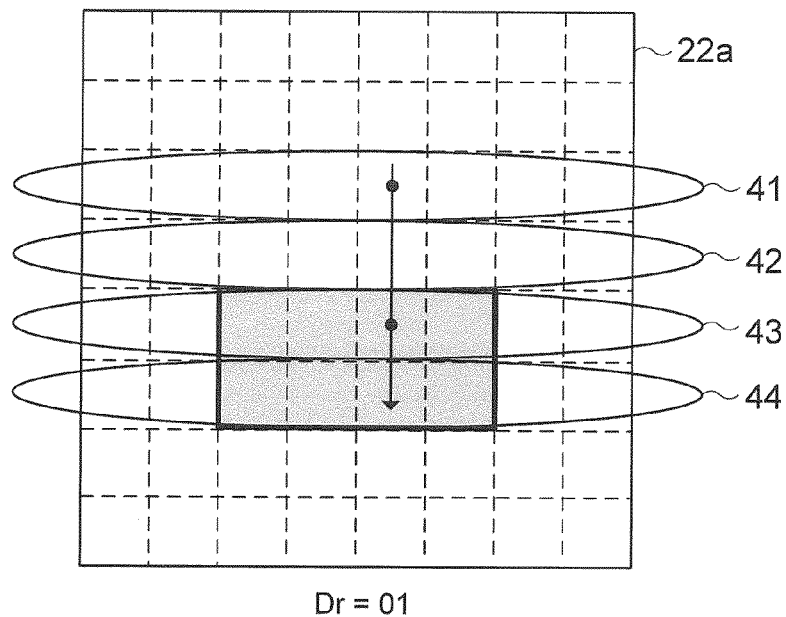
FIG. 8 is a diagram illustrating the image data 22a obtained by photographing the visible light emitted according to the modulation signal of FIG. 7.

FIG. 8 is a diagram illustrating the image data 22a obtained by photographing the visible light emitted according to the modulation signal of FIG. 7. As illustrated in the figure, a portion of the light source 12 appears in the fifth and sixth scan lines 43 and 44 corresponding to the fifth and sixth lines 33 and 34 of the light receiver 21 photographed at the time t3 and t4, respectively. Next, since fm=frx/2, the demodulator 23 samples the luminance of one scan line among successive two scan lines, for example, the luminance of the scan lines 41 and 43 in the area corresponding to the light source 12. Next, the demodulator 23 combines the sampled values and set the combined value "01" as the reception data Dr.

More generally, in the case where fm=frx/p, that is, Tm=p*Trx, the demodulator 23 may sample scan lines, the number of the sampled lines being a multiple number of p from a first scan line in the area corresponding to the light source 12. In the case where the multiple number of p is not an integer, the demodulator 23 may sample scan lines, the number of the sampled lines being closest to a rounded-off multiple number of p, for example.

In this manner, in the first embodiment, the chip rate fm of the modulation signal is set to be larger than the frame rate ff of the light receiver 21. Then, the luminance of the image data is sampled according to a ratio of the chip rate fm and the line scan frequency frx to generate the reception data Dr. In the receiver 200, the image at the entire angle of viewing can be obtained (while previewing) by the light receiver 21, and the information from the light source 12 which blinks at a frequency higher than the frame rate ff of the light receiver 21 can be received. In addition, since a specialized light receiver 21 is not used, compatibility with an existing image sensor can be secured, thereby, suppressing an increase in costs of implementation.

Note that, when the transmitter 100 includes a plurality of the light sources 12, the chip rates of the light sources 12 may be different from each other. Furthermore, the tone of luminance is not only a binary value of "0" and "1" but also a ternary value or more.

Second Embodiment

In a second embodiment described hereinafter, a position of a light source 12 is detected from image data to generate reception data Dr.

Figure 9:
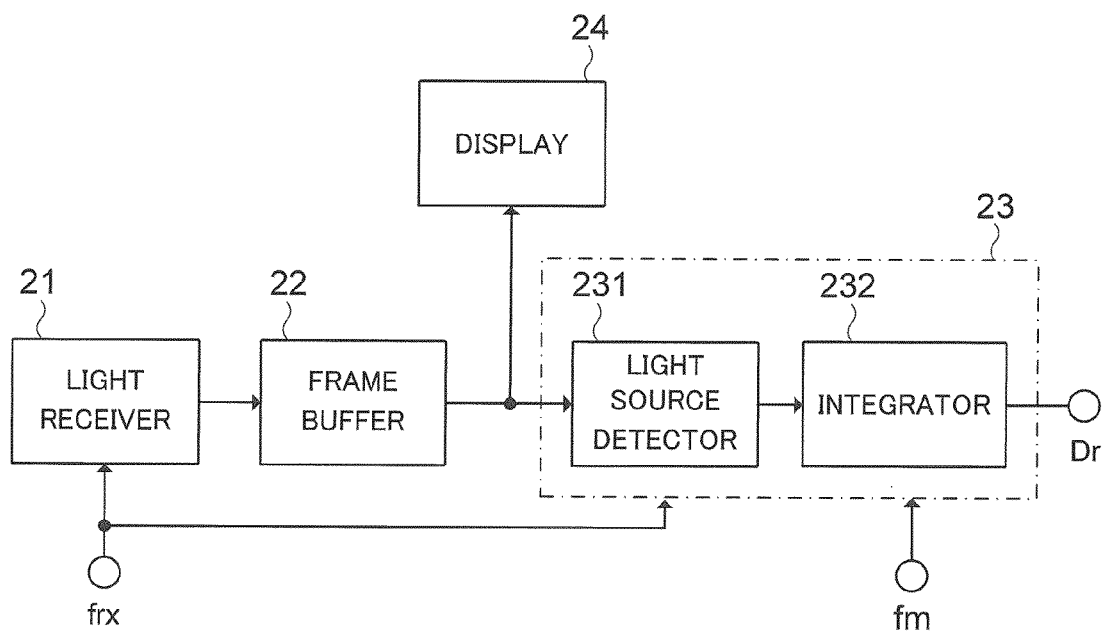
FIG. 9 is a block diagram illustrating an internal configuration of a receiver 201 of a transmission system according to the second embodiment.

FIG. 9 is a block diagram illustrating an internal configuration of a receiver 201 of a transmission system according to the second embodiment. In FIG. 9, the same components as those of FIG. 1 are denoted by the same reference numerals, and the difference will be mainly described hereinafter. A demodulator 23 of the receiver 201 includes a light source detector 231 and an integrator 232.

In the embodiment, a modulation signal generated by a transmitter 100 includes a synchronization signal having a predefined pattern. The light source detector 231 searches the synchronization signal from image data to detect an area corresponding to a light source 12. The integrator 232 samples luminance and combines sampled values in the detected area to generate reception data Dr.

Figure 10:
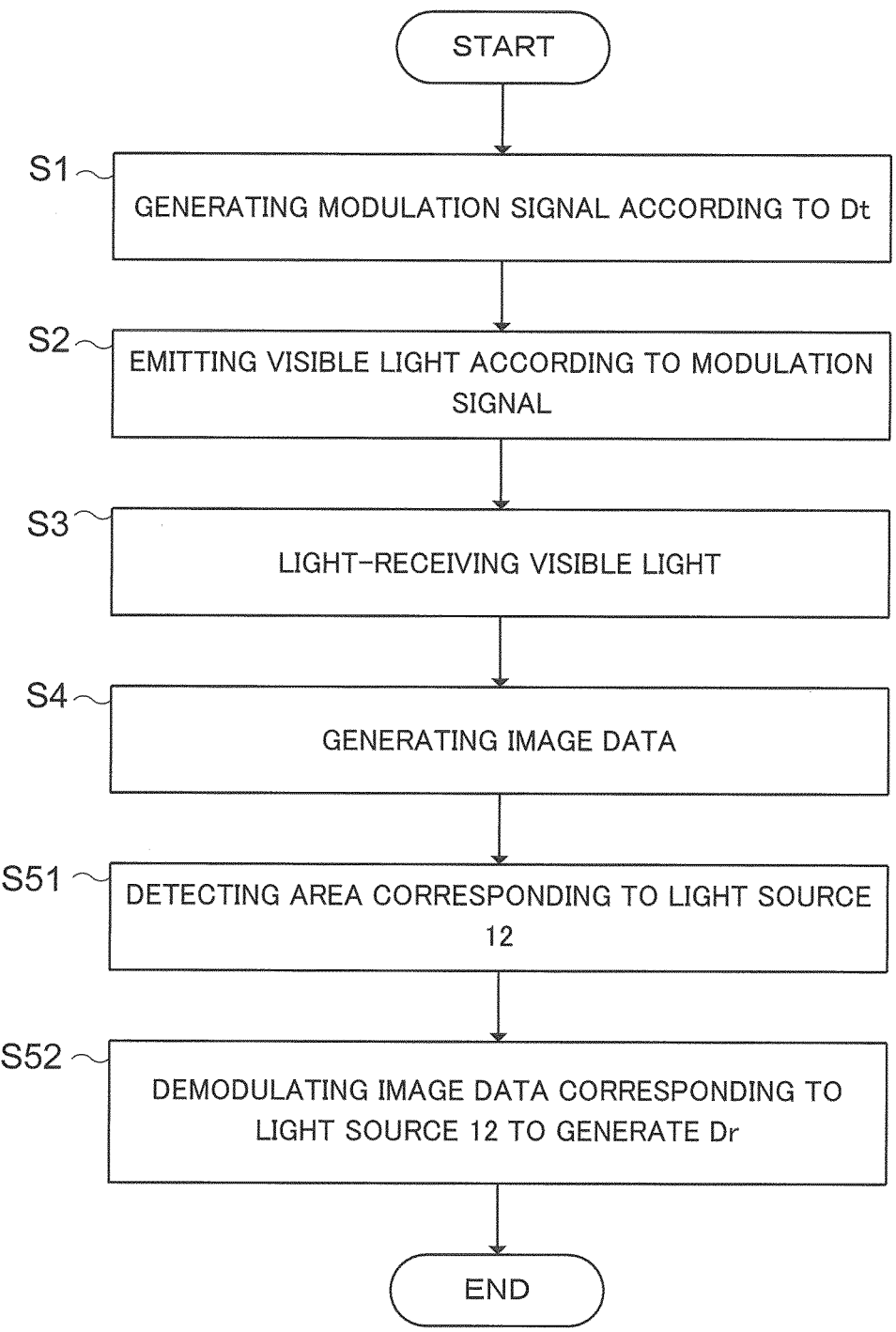
FIG. 10 is a flowchart illustrating an example of processing operations of the transmission system according to the second embodiment.

FIG. 10 is a flowchart illustrating an example of processing operations of the transmission system according to the second embodiment. In the embodiment, after the image data are generated (Step S4), the light source detector 231 detects the area corresponding to the light source 12 (Step S51). Next, the integrator 232 demodulates the image data of the area corresponding to the light source 12 to generate the reception data Dr (Step S52). More specifically, the integrator 232 samples luminance and combines the sampled values in the image data of the area corresponding to the light source 12 to generate the reception data Dr.

Figure 11:
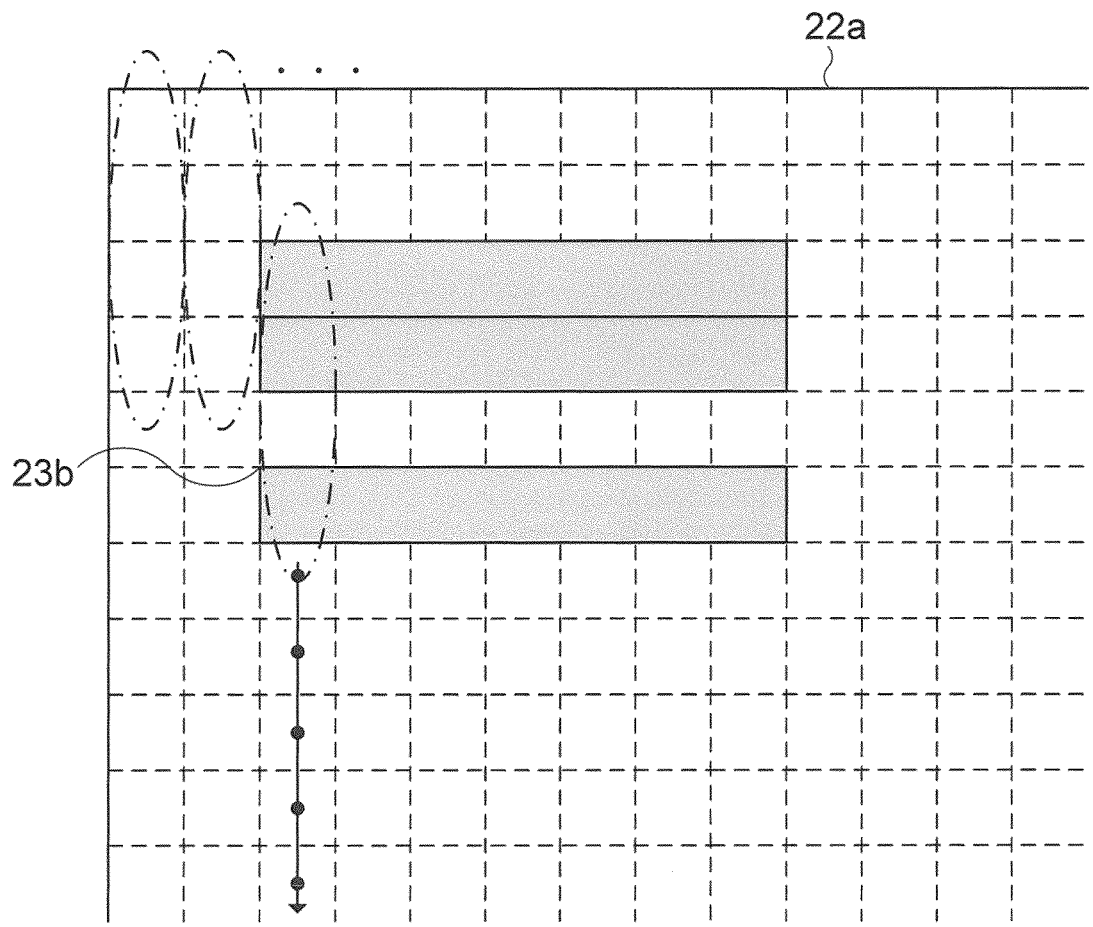
FIG. 11 is a schematic diagram illustrating processing operations of the light source detector 231.

FIG. 11 is a schematic diagram illustrating processing operations of the light source detector 231. The figure illustrates the image data 22a where the synchronization signal Sync="1101" (4-bits) and fm=frx. As illustrated by one-dot dashed line, the light source detector 231 sequentially samples luminance of the successive four scan lines to search the synchronization signal "1101". For example, the light source detector 231 performs inner product of the sampled value and the synchronization signal for searching.

Next, as denoted by reference numeral 23b in FIG. 11, when the synchronization signal Sync is detected, the integrator 232 samples the luminance of the scan lines subsequent to the synchronization signal Sync and combines the sampled values to generate a reception signal Dr.

In this manner, in the second embodiment, the light source detector 231 is provided so as to identify the position of the light source 12. Therefore, it is possible to generate the reception data Dr at a high accuracy.

Note that, the synchronization signal may be generated by modulating the luminance of the visible light emitted by the light source 12 instead of a combination of the value 0 and the value 1.

Third Embodiment

A third embodiment described hereinafter is a specific example of the second embodiment.

A modulation signal including the synchronization signal Sync described in the second embodiment is generated by the modulator 11 of the transmitter 100.

Figure 12:
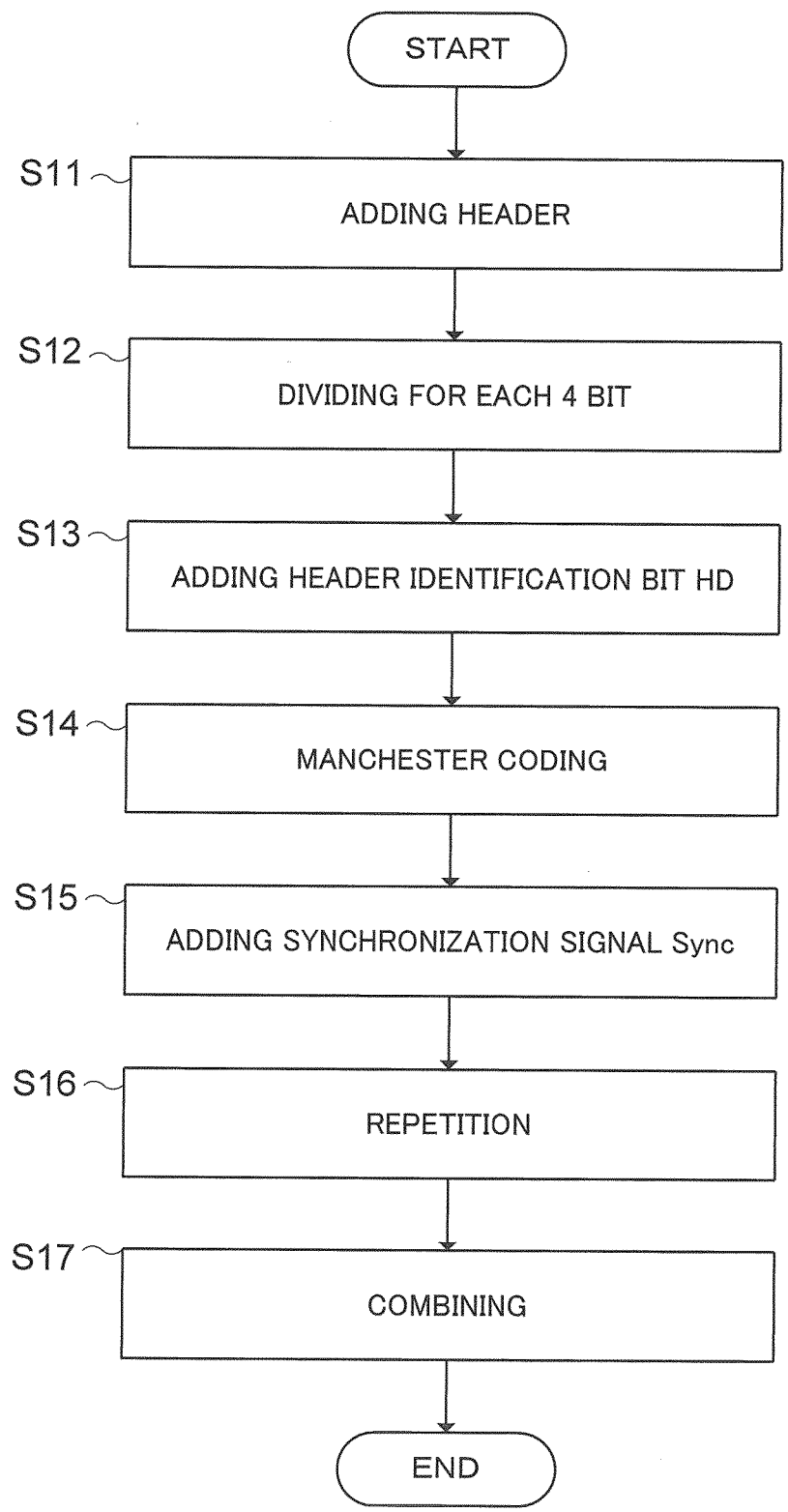
FIG. 12 is a flowchart illustrating a modulation signal generation procedure according to the third embodiment.
Figure 13:
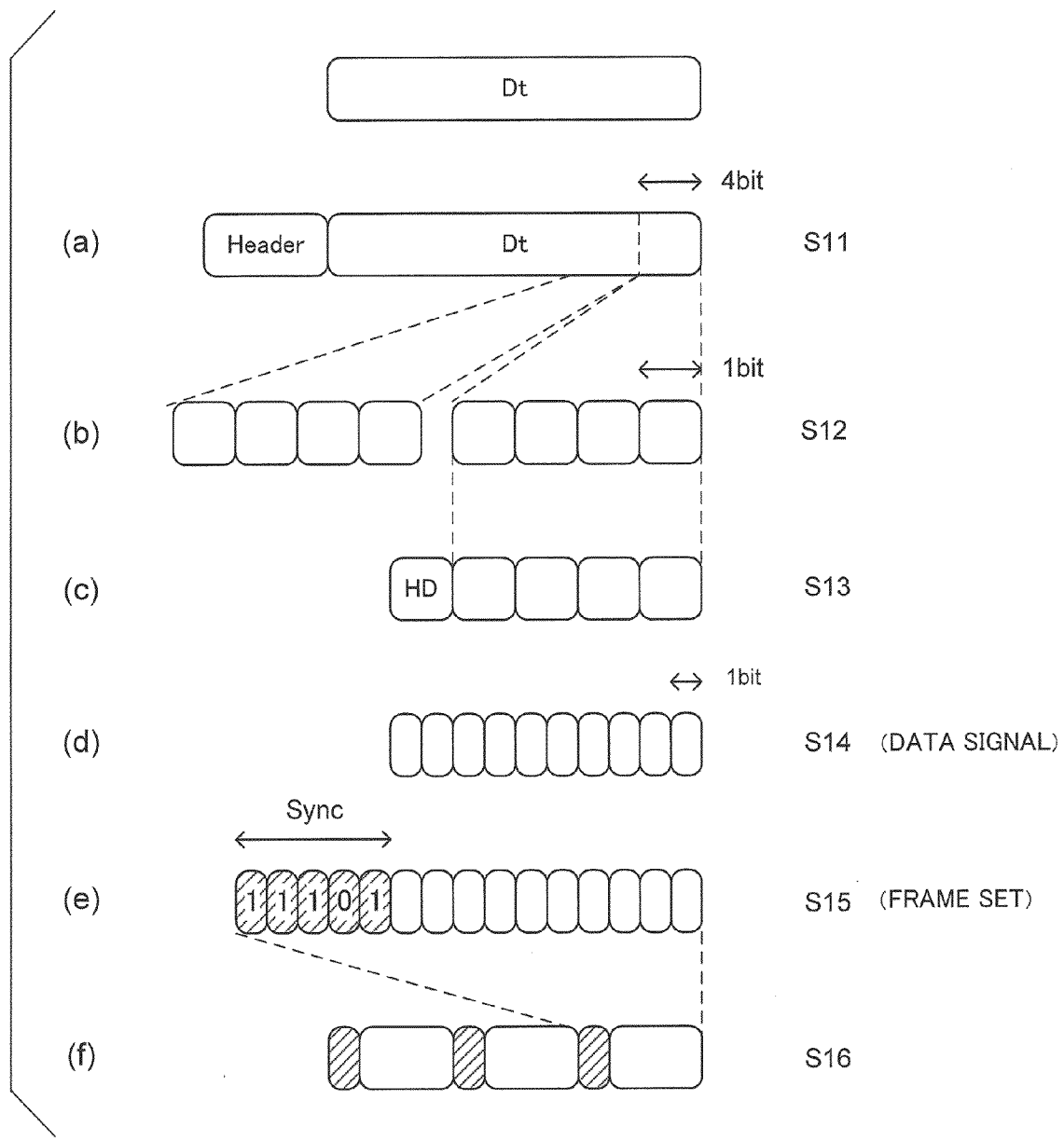
FIG. 13 is a diagram illustrating the modulation signal generation procedure.
Figure 14:
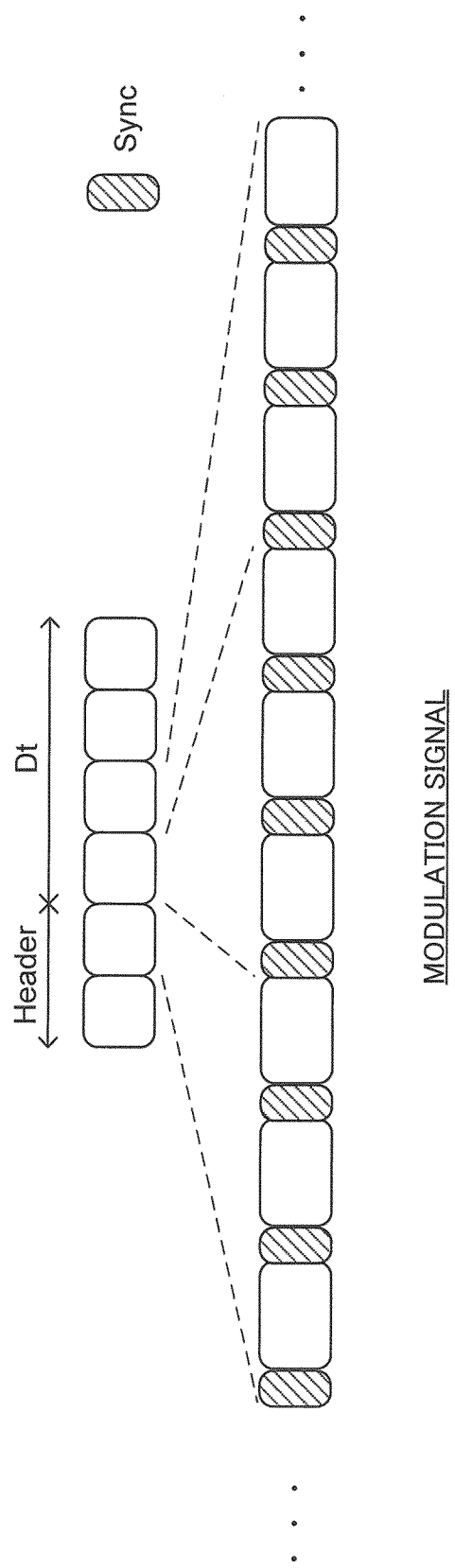
FIG. 14 is a diagram illustrating the modulation signal generation procedure.

FIG. 12 is a flowchart illustrating a modulation signal generation procedure according to the third embodiment. In addition, FIGS. 13 and 14 are diagrams illustrating the modulation signal generation procedure.

First, the modulator 11 adds a header to the transmission data Dt (Step S11). The header is, for example, a 1-byte signal indicating a front end of a modulation signal and a length of a data signal Dt. In addition, the length of the data signal Dt is a multiple of one byte and is in a range of 1 byte to 255 bytes. Accordingly, a signal illustrated in FIG. 13(a) is generated.

Subsequently, the modulator 11 divides the header and the signal composed of the transmission data Dt generated in Step S11 in unit of four bits (Step S12). Accordingly, a signal illustrated in FIG. 13(b) is generated.

Next, the modulator 11 adds a header identification bit HD to the signal generated in Step 12 and composed of the divided four bits (Step S13). The header identification bit HD is composed of one bit. If the added four bits are a header, the header identification bit HD is set to have the value 1; and if the added four bits are not a header but transmission data Dt (or a portion thereof), the header identification bit HD is set to have the value 0. Accordingly, a signal illustrated in FIG. 13(c) is generated.

Next, the modulator 11 performs Manchester coding on a signal generated in Step S13 and composed of the header identification bit HD and the divided four bits (Step S14). Accordingly, a signal illustrated in FIG. 13(d) is generated. Hereinafter, the signal is simply referred to as a data signal.

In addition, the modulator 11 adds the synchronization signal Sync to the data signal generated in Step S14 (Step S15). The synchronization signal is, for example, a Barker sequence of 5 or more and is, for example, a Barker 5 of "11101". Accordingly, a signal illustrated in FIG. 13(e) is generated. The signal is referred as a frame set. The frame set is a signal which should be photographed at least one time in one frame of the light receiver 21. In addition, the modulator 11 repeats the frame set generated in Step S15 predetermined times (Step S16). Accordingly, a signal illustrated in FIG. 13(f) is generated. The repetition number is set so that the time interval when the same frame set is repeated is equal to or longer than the frame period Tf which is a reciprocal of the frame rate ff. More specifically, if the time of the frame set in FIG. 13(e) is denoted by Tb, the repetition number C is set to satisfy the following equation (2).

$$C*Tb \geq 1/ff \quad (2)$$

The modulator 11 performs the above-described Steps S13 to S16 on all the 4-bit signals generated in Step S12. Next, the after-repetition signals generated in Step S16 are combined, and thus, a modulation signal illustrated in FIG. 14 is generated.

Herein, the reason why Manchester coding is performed on the data signal and the synchronization signal is set to a Barker sequence of 5 or more will be described.

Figures 15, 16:
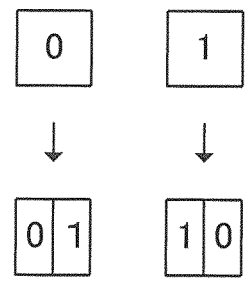
FIG. 15 is a diagram illustrating Manchester coding.
FIG. 16 is a diagram illustrating a Barker sequence.

FIG. 15 is a diagram illustrating Manchester coding. In the Manchester coding, the value 0 is coded into "01"; and the value 1 is coded into "10". According to this coding manner, since the duty ratio, that is, a ratio of the value 0 and the value 1 is 50%, it cannot be easily recognized by human eyes that the visible light emitted by the light source 12 is modulated. In addition, three or more successive 0s never appear and three ore more successive 1s never appear by any arrangement of the Manchester codes. Therefore, "111" does not appear in the data signal.

FIG. 16 is a diagram illustrating a Barker sequence. As illustrated, Barker 5, Barker 7, Barker 11, and Barker 13 are known as a Barker sequence of 5 or more. All the sequences include at least one pattern of "111". Therefore, in the Manchester-coded data signal, the synchronization signal Sync does not appear in the data signal. Accordingly, the detection error of the synchronization signal Sync can be prevented.

Figure 17:
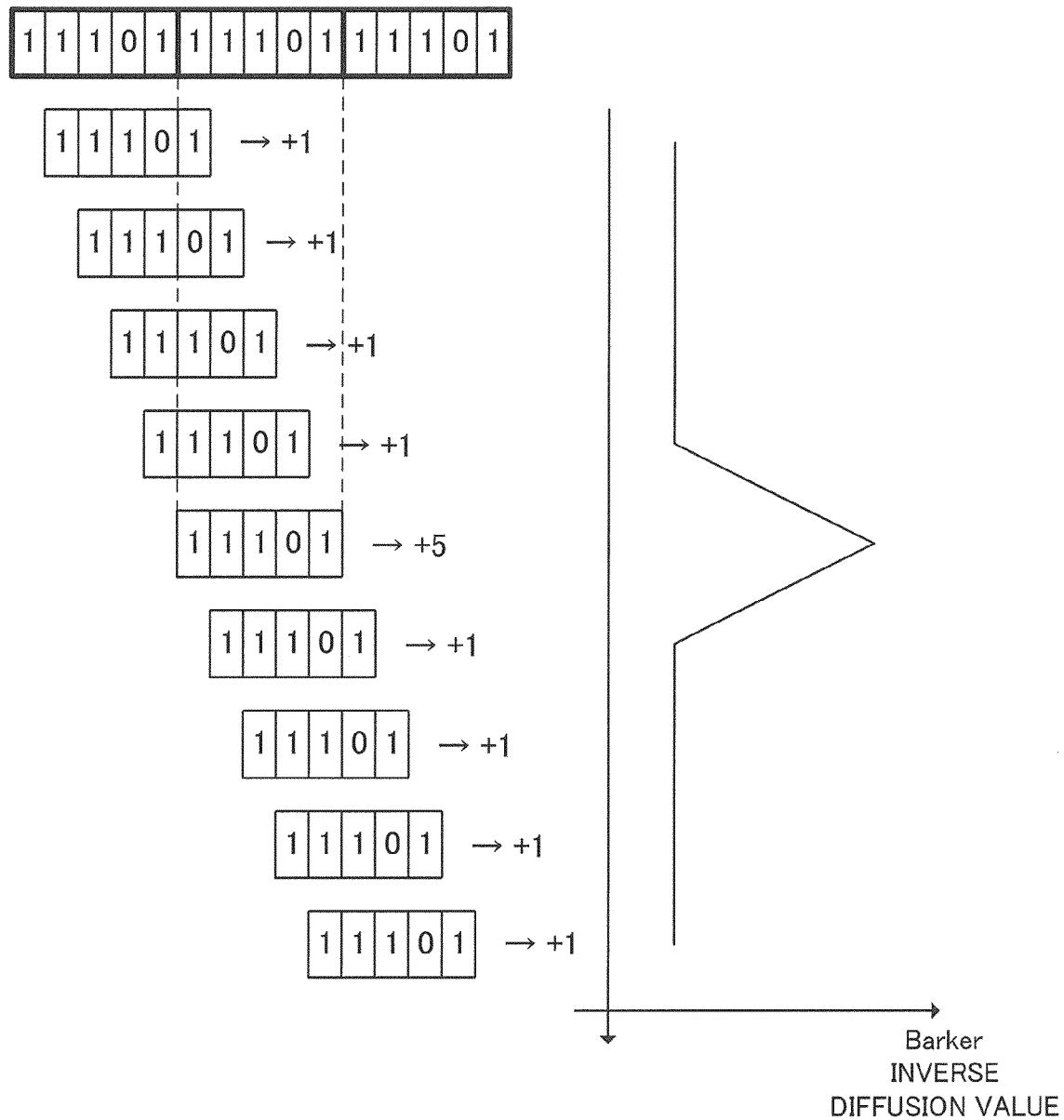
FIG. 17 is a diagram illustrating reverse diffusion of a Barker sequence.

The Barker sequence is a sequence whose auto correlation peak becomes maximum and is suitable to perform time synchronization at a high accuracy. FIG. 17 is a diagram illustrating reverse diffusion of a Barker sequence. As illustrated, the auto correlation value is large, while other correlation values are small. Therefore, the light source detector 231 performs a Barker reverse diffusion process to obtain the peak position thereof, so that the light source detector 231 can detect the position of the light source 12. In addition, the integrator 232 may perform a Manchester reverse diffusion process based on the detected position to generate the reception data Dr.

In this manner, in the third embodiment, the synchronization signal is set to a Barker sequence of 5 or more, and the Manchester coding is performed on the data signal. Therefore, the synchronization signal Sync can be detected at a high accuracy.

Note that, the Manchester coding and the Barker sequences described above are exemplary ones. The frame set may include a coded data signal and a synchronization signal which does not appear therein. In addition, the frame set may include at least the synchronization signal Sync and the transmission data Dt, and the frame set may further include information for error correction and the like.

Fourth Embodiment

In a fourth embodiment described hereinafter, a frame determination bit is further added to the transmission data Dt.

Figure 18:
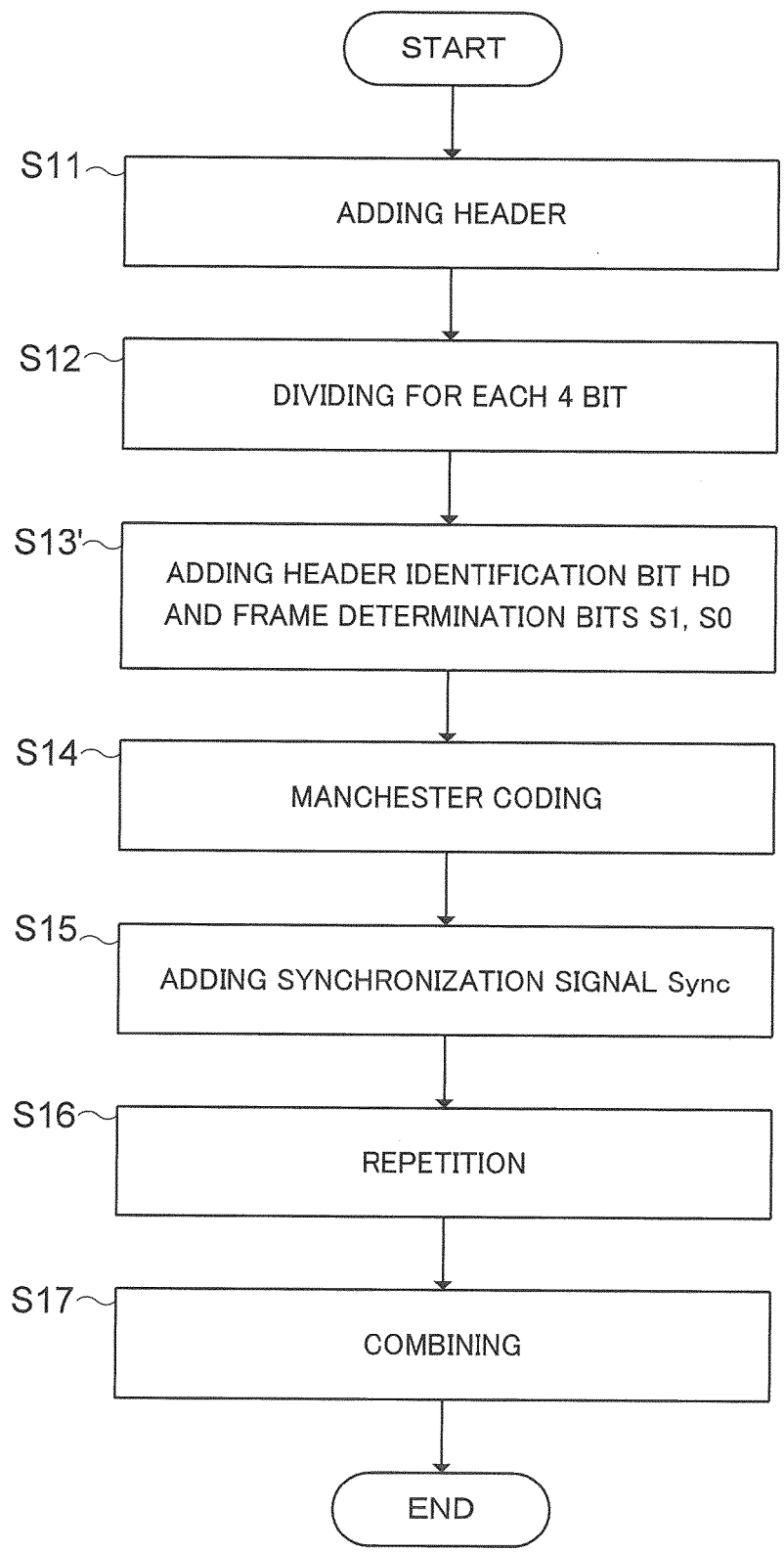
FIG. 18 is a flowchart illustrating a modulation signal generation procedure according to the fourth embodiment.
Figure 19:
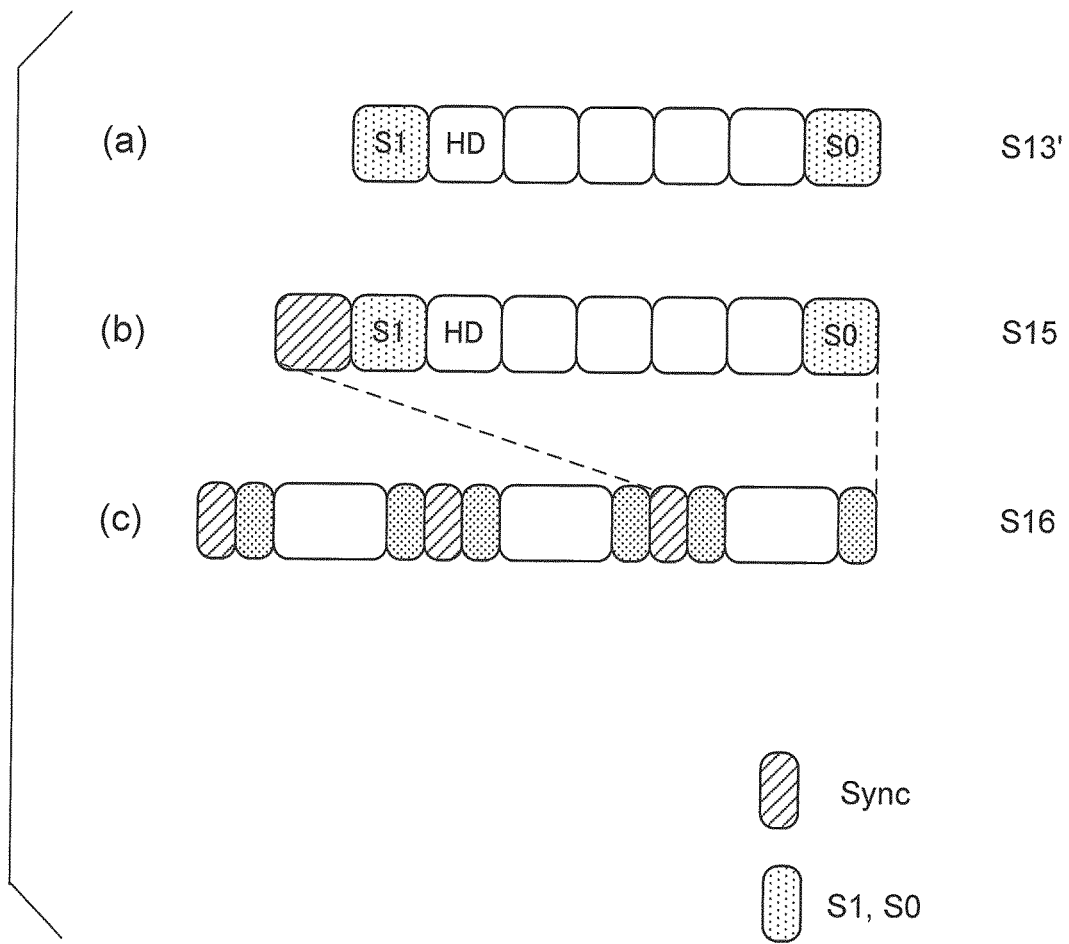
FIG. 19 is a diagram illustrating the modulation signal generation procedure.
Figure 20:
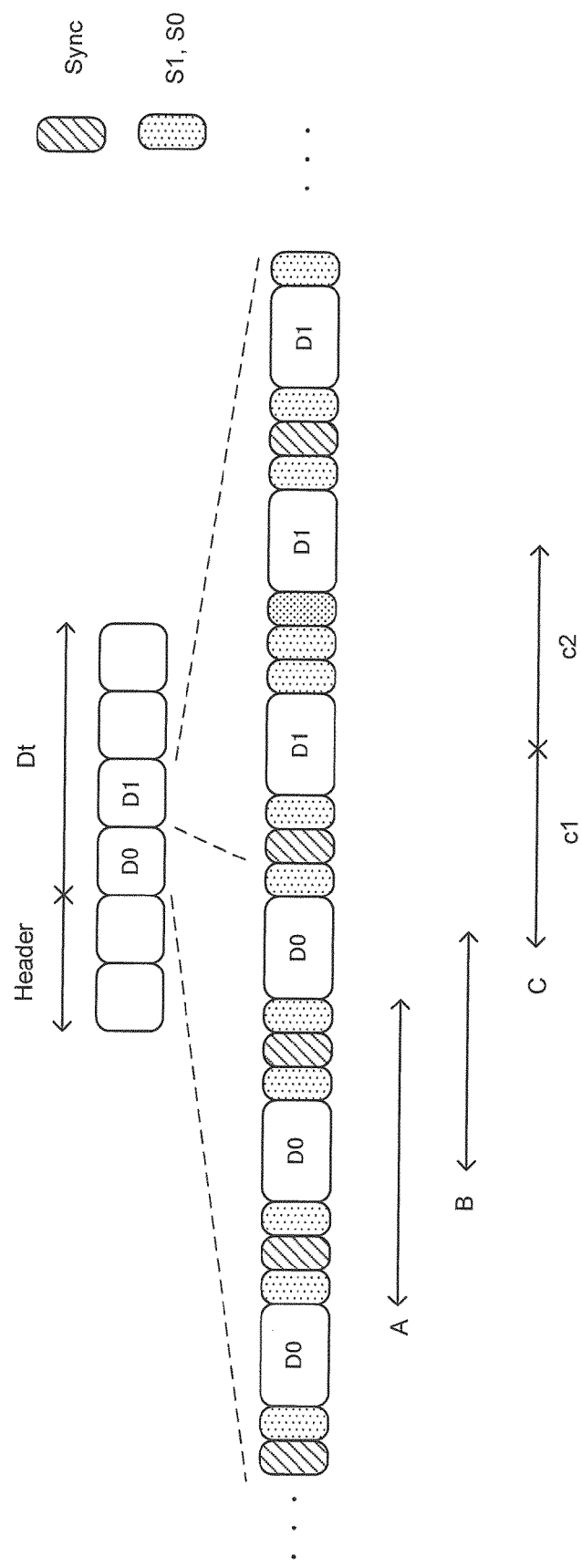
FIG. 20 is a diagram illustrating the modulation signal generation procedure.

FIG. 18 is a flowchart illustrating a modulation signal generation procedure according to the fourth embodiment. In addition, FIGS. 19 and 20 are diagrams illustrating the modulation signal generation procedure. Hereinafter, different points from the third embodiment (FIGS. 12 to 14) will be mainly described.

In addition to the header identification bit HD, the modulator 11 according to the embodiment adds frame determination bits S0 and S1 to the data signal (Step S13'). As illustrated in FIG. 19(a), each of the frame determination bits S0 and S1 has one bit. The frame determination bits S0 and S1 are added before and after the header identification bit HD, more specifically, added as the most significant bit and the least significant bit of the data signal.

When the divided four bits are the higher 4 bits of one byte before the division, each of the frame determination bits S0 and S1 is set to have the value 1; and when the divided four bits are the lower 4 bits of one byte before the division, each of the frame determination bits S0 and S1 is set to have the value 0. As a result, the frame determination bits S0 and S1 added to particular four bits have the same value, while the frame determination bits S0 and S1 added to particular four bits are different from those added to successive four bits.

Next, the modulator 11 performs Manchester coding on the signal generated in Step S13' (Step S14) and adds the synchronization signal Sync to the resulting signal (Step S15). Accordingly, a frame set illustrated in FIG. 19(b) is generated.

Next, the modulator 11 repeats the frame set predetermined times (Step S16 in FIG. 19(c)) and combines the frame sets (Step S17) to generate a modulation signal illustrated in FIG. 20.

It is assumed that the modulation signal illustrated in FIG. 20 is photographed by the light receiver 21 with various phases according to a photographing timing, a distance between the light source 12 and the light receiver 21, or the like.

Figure 21:
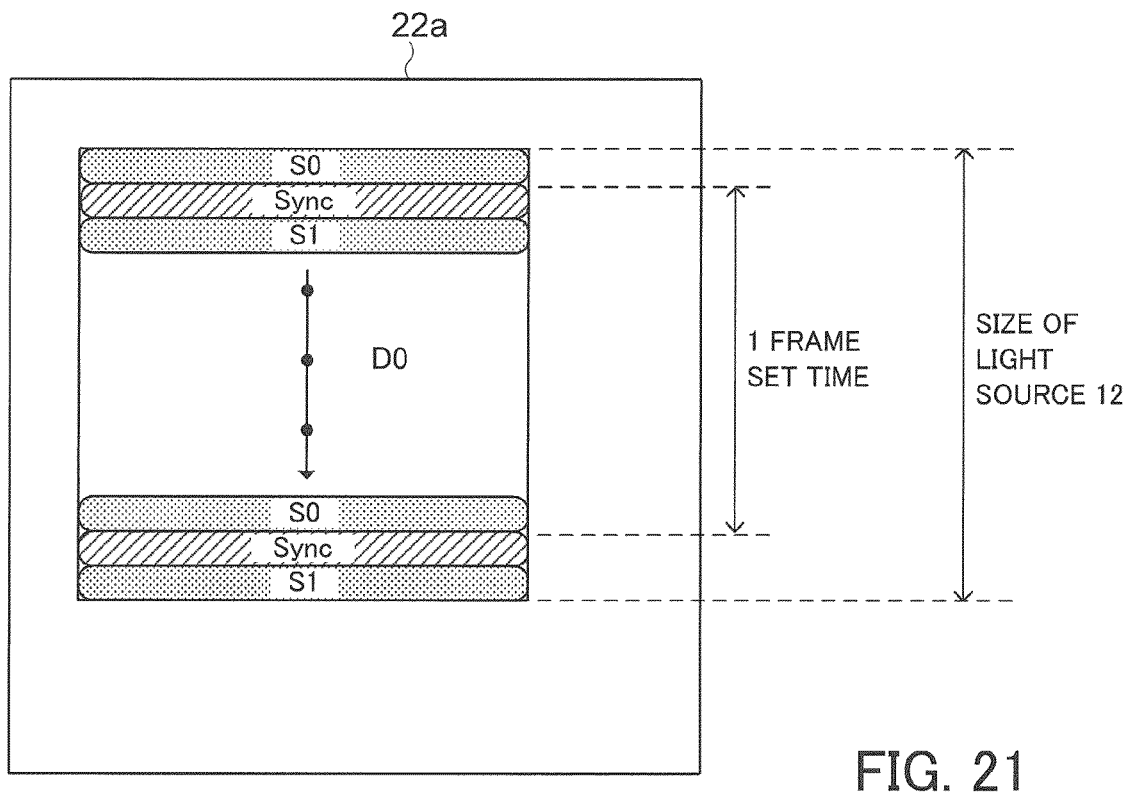
FIG. 21 is a diagram illustrating image data in the case where photographing is performed at the timing A of FIG. 20.

FIG. 21 is a diagram illustrating image data in the case where photographing is performed at the timing A of FIG. 20. In the figure, a visible light on which two synchronization signals Sync and data D0 (a portion of transmission data Dt) between the two synchronization signals Sync are superposed is photographed. In this case, the integrator 232 samples luminance of scan lines between the scan lines where the two synchronization signals Sync are photographed, so that the integrator 232 can decode the data D0.

In the case where photographing is performed at timing shown in FIG. 21, a decoding process can be relatively simply and easily performed. However, a modulation signal may be photographed at a different timing.

Figure 22:
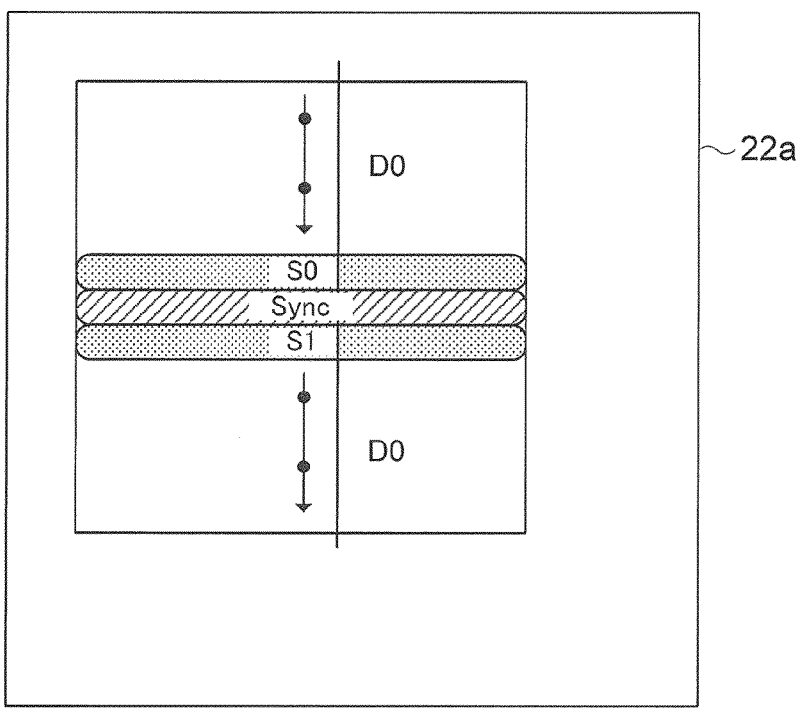
FIG. 22 is a diagram illustrating image data in the case where photographing is performed at the timing B of FIG. 20.

FIG. 22 is a diagram illustrating image data in the case where photographing is performed at the timing B of FIG. 20. In the figure, a visible light on which one synchronization signal Sync, a portion of the data D0 before the synchronization signal Sync, and a portion of the data D0 after the synchronization signal Sync are superposed is photographed. In other words, the data before the synchronization signal Sync and the data after the synchronization signal Sync are a portion of the same data D0. In this case, the value of the frame determination bit S0 before the synchronization signal Sync is the same as the value of the frame determination bit S0 after the synchronization signal Sync.

On the basis that the values of the frame determination bits S0 and S1 are the same, the integrator 232 can recognize that data before the synchronization signal Sync and data after the synchronization signal Sync are a portion of the same data. Therefore, the integrator 232 can decode the data D0 by cyclically sampling and combining the scan line corresponding to the lower portion of the light source 12 from the scan line lower than the frame determination bit S1 and the scan line upper than the frame determination bit S0 from the scan line corresponding to the upper portion of the light source 12.

Figure 23:
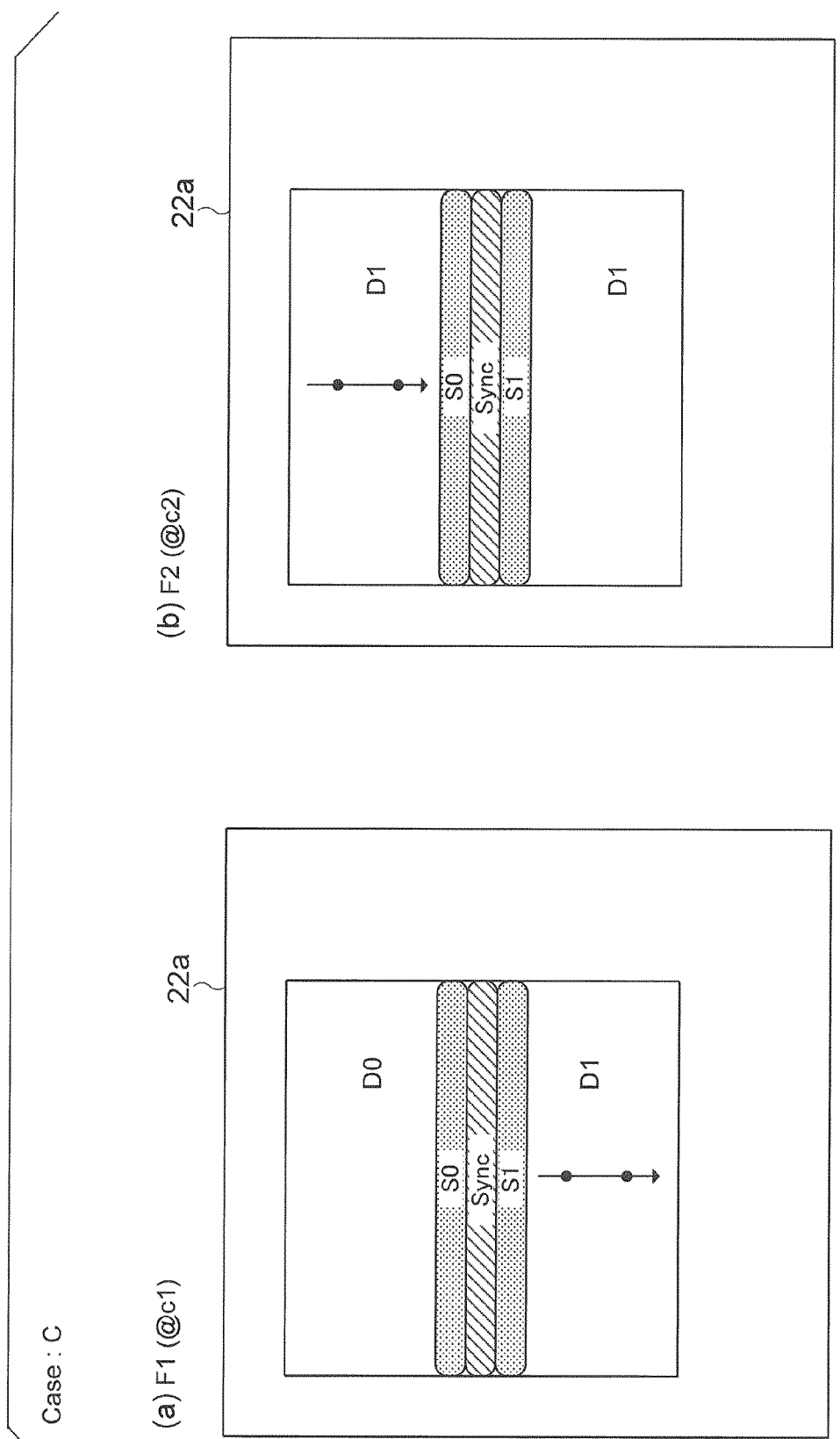
FIG. 23 is a diagram illustrating image data in the case where photographing is performed at the timing C of FIG. 20.

FIG. 23 is a diagram illustrating image data in the case where photographing is performed at the timing C of FIG. 20. In this case, in the frame F1 (FIG. 23(a)) photographed in the time interval c1, a second half of the data D0, the synchronization signal Sync, and a first half of the data D1 appear. In the frame F2 (FIG. 23(b)) photographed in the time interval c2, a second half of the data D1, the synchronization signal Sync, and a first half of the data D1 are shown. In this case, in the frame F1 illustrated in FIG. 23(a), the value of the frame determination bit S0 added to the data D0 is different from the value of the frame determination bit S1 added to the data D1. On the other hand, in the frame F2 illustrated in FIG. 23(b), since both of the determination bits S0 and S1 are added to the data D1, the values thereof are the same.

On the basis that the values of the frame determination bits S0 and S1 are different from each other, the integrator 232 can recognize that data before the synchronization signal Sync and data after the synchronization signal Sync are portions of different data. Therefore, the integrator 232 does not perform cyclic sampling, as illustrated in FIG. 22, on the image data of the frame F1. The integrator 232 can decode the data D1 by sampling and combining the scan line corresponding to the lower portion of the light source 12 from the scan line lower than the frame determination bit S1 in the image data of the frame F1 and the scan line upper than the frame determination bit S0 from the scan line corresponding to the upper portion of the light source 12 in the image data of the frame F2. Alternatively, the integrator 232 may not perform a decoding process on the frame F1 but it may decode the data D1 by cyclically sampling and combining by using the frame F2.

In this manner, in the fourth embodiment, the modulation signal includes the frame determination bits S0 and S1 added before and after the synchronization signal Sync, respectively. Therefore, it can be determined whether the data before the synchronization signal Sync and data thereafter included in the light source 12 photographed are a portion of the same data or a portion of different data. Therefore, even in the case where the light source 12 photographed by the light receiver 21 is small, it is possible to stably generate the reception data Dr.

Note that, in the embodiment, although the example where the determination bits as determination data are added before and after the synchronization signal Sync is described, the determination bits may be added to at least two of a position before the divided transmission data, a position within it, and a position after it. In addition, instead of the determination bit which having one bit, a bit sequence including a plurality of bits may be added as the determination data.

Fifth Embodiment

In the second embodiment described above, the synchronization signal is searched from the entire image data. On the contrary, in a fifth embodiment described hereinafter, a candidate area for the position of the light source 12 is detected from the image data, and the synchronization signal is searched within the candidate area.

Figure 24:
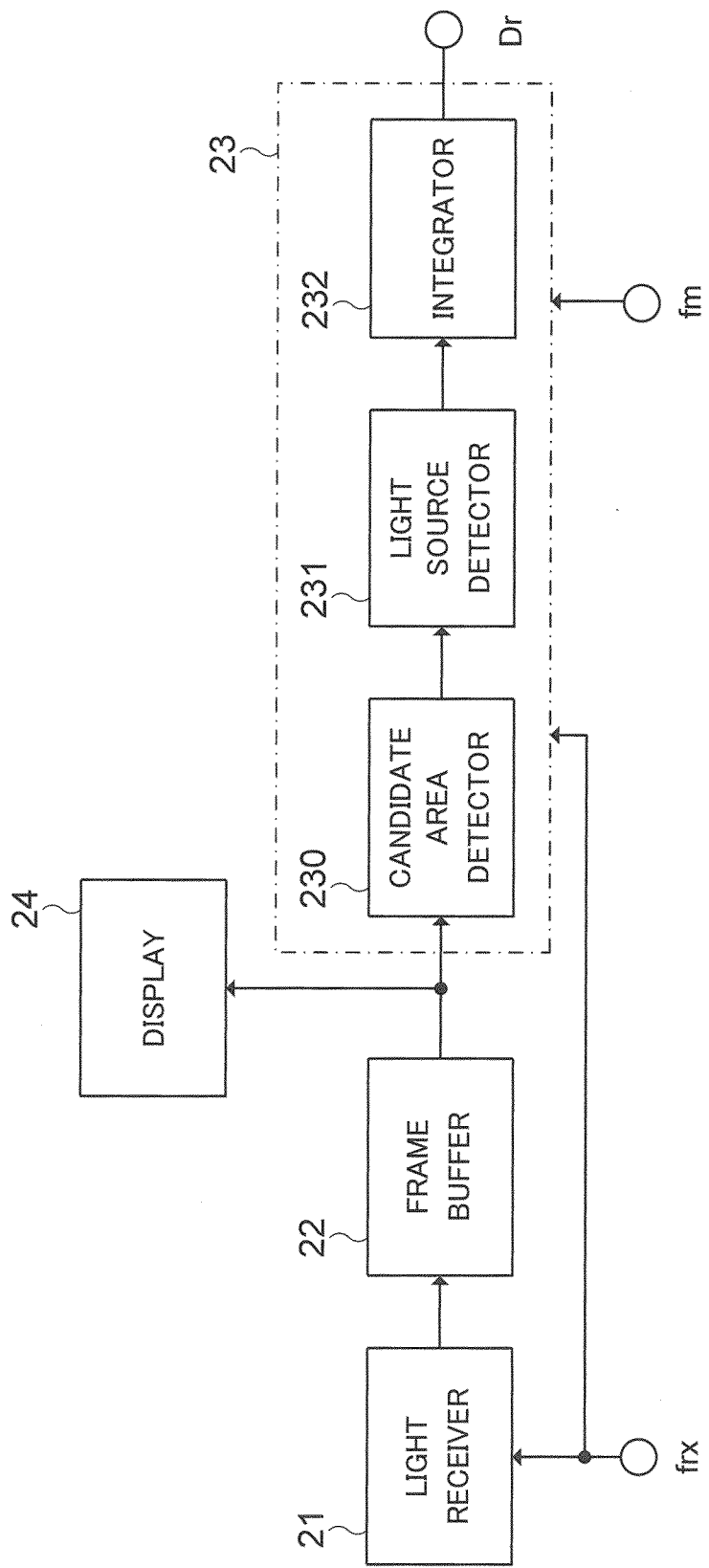
FIG. 24 is a block diagram illustrating an internal configuration of a receiver 202 according to the fifth embodiment.

FIG. 24 is a block diagram illustrating an internal configuration of a receiver 202 according to the fifth embodiment. In FIG. 24, the same components as those of FIG. 9 are denoted by the same reference numerals, and the difference will be mainly described hereinafter. A demodulator 23 of the receiver 202 further includes a candidate area detector 230.

The candidate area detector 230 detects a candidate area corresponding to the light source 12 from the image data. For example, the candidate area detector 230 detects edges in the direction perpendicular to the scan line (hereinafter, for the convenience, referred to as a vertical direction) from the image data and sets an area where edges densely exist as a candidate area. Alternatively, the candidate area detector 230 sets an area having high correlation in luminance in the direction of the scan line (hereinafter, for the convenience, referred to as a horizontal direction) detected from the image data as a candidate area. In the case where the light source 12 emits a visible light which is sufficiently brighter than the peripheral portion, as illustrated in FIG. 6 and the like, in the area corresponding to the light source 12, edges in the vertical direction occur between the light source 12 and the peripheral portion thereof, or horizontal stripes with the same value in the horizontal direction consecutively occur in the light source 12.

Next, the light source detector 231 detects the area corresponding to the light source 12 by retrieving the synchronization signal Sync within the candidate area.

Figure 25:
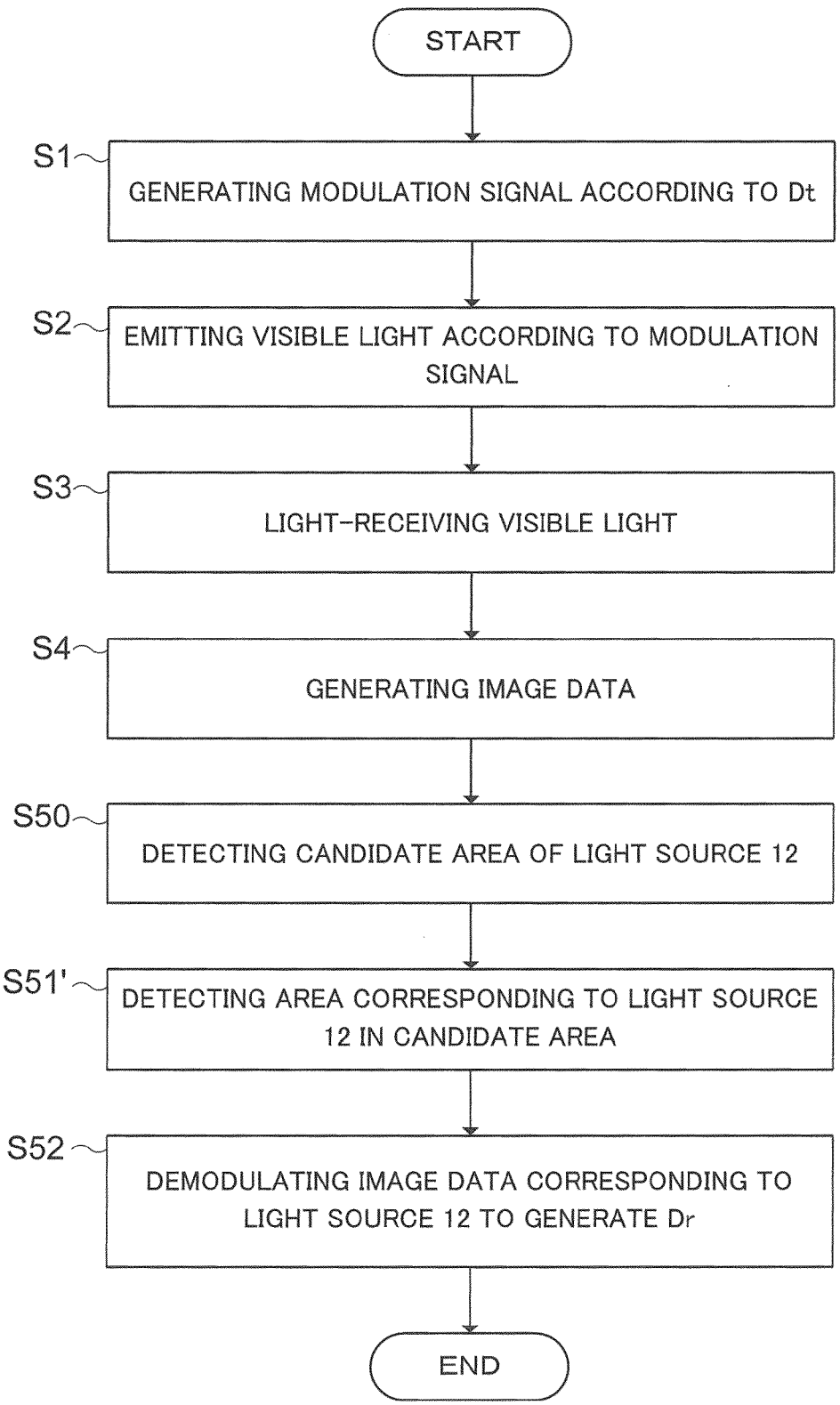
FIG. 25 is a flowchart illustrating an example of processing operations of the transmission system according to fifth embodiment.

FIG. 25 is a flowchart illustrating an example of processing operations of the transmission system according to fifth embodiment. In the embodiment, after the image data are generated (Step S4), the candidate area detector 230 detects the candidate area of the light source 12 (Step S50). Next, the light source detector 231 detects the area corresponding to the light source 12 within the candidate area instead of the entire image data (Step S51').

In this manner, in the fifth embodiment, the candidate area corresponding to the light source 12 is determined in advance, and the synchronization signal is searched within the candidate area instead of the entire image data. Therefore, it is possible to more accurately detect the position of the light source 12 and to reduce the processing amount and calculation time of the light source detector 231.

Sixth Embodiment

In a sixth embodiment described hereinafter, a focal distance of the light receiver 21 is adjusted according to the reception data Dr.

Figure 26:
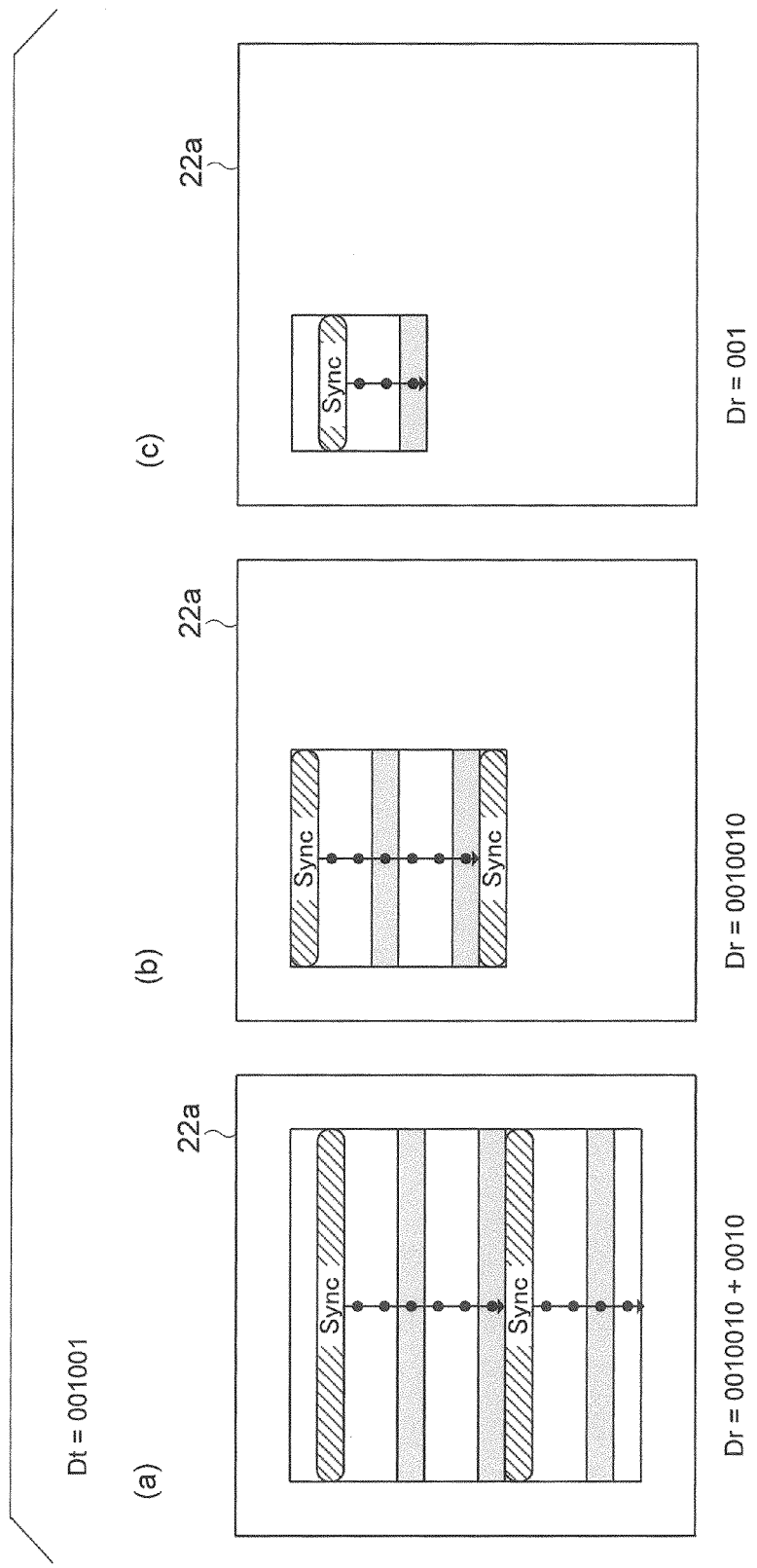
FIG. 26 is a diagram illustrating a relation between the light source 12 photographed by the light receiver 21 and the reception data Dr.

FIG. 26 is a diagram illustrating a relation between the light source 12 photographed by the light receiver 21 and the reception data Dr, in which an example is shown where the transmission data Dt="001001". In addition, FIG. 26 illustrates only the synchronization signal Sync and the transmission data Dt.

FIG. 26(b) illustrates the image data 22a in the case where the focal distance is set properly. In other words, between the two synchronization signals Sync, the reception data Dr="001001" of one frame set equivalent to the transmission data Dt is generated without excess or deficiency.

FIG. 26(a) illustrates the image data 22a in the case where the focal distance is set to be too long. In this case, in addition to the data "001001" between the two synchronization signals Sync, Data "0010" are generated after the second synchronization signal Sync. The data are longer than one frame set. In this case, since the light source 12 is photographed in a large size, the light source 12 is photographed to be dark, so that there is a problem in that erroneous reception data Dr may be generated. In addition, in the case where a plurality of light sources 12 emit visible light on which the transmission data Dt are superposed, there is a problem in that only one light source 12 can be photographed. Therefore, in the case of FIG. 26(a), it is preferable that the focal distance is adjusted to be short, so that the light source 12 is photographed in a smaller size.

FIG. 26(c) illustrates the image data 22a in the case where the focal distance is set to be too short. In this case, only data "001" shorter than one frame set are disposed after the synchronization signal Sync, and the reception data Dr become an erroneous value where a bit is omitted. Therefore, in the case of FIG. 23(c), it is preferable that the focal distance is adjusted to be long, so that the light source 12 is photographed in a larger size.

By taking into consideration the above configuration, the sixth embodiment will be described.

Figure 27:
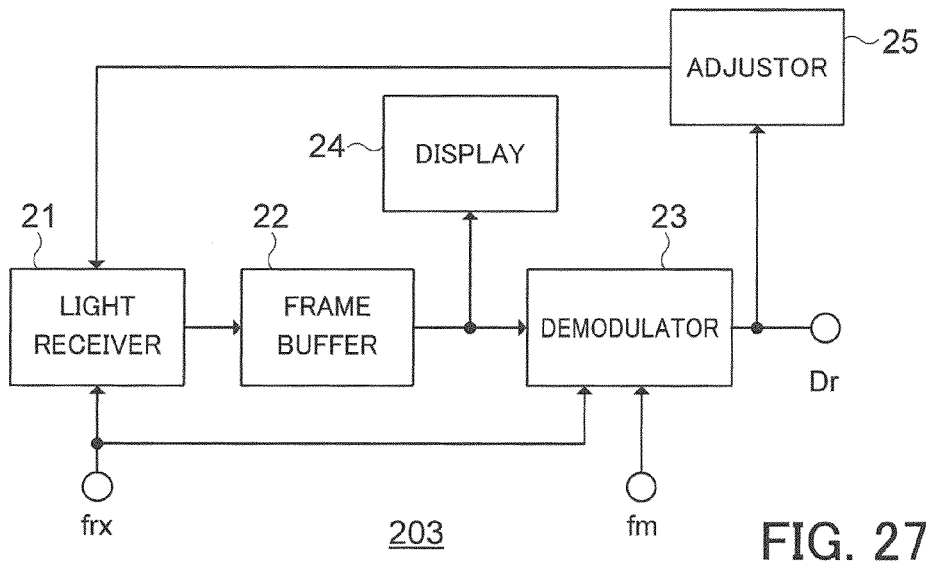
FIG. 27 is a block diagram illustrating an internal configuration of a receiver 203 according to the sixth embodiment.

FIG. 27 is a block diagram illustrating an internal configuration of a receiver 203 according to the sixth embodiment. In the figure, the receiver 203 further includes an adjustor 25. First, the adjustor 25 determines whether or not the reception data Dr is proper. Next, the adjustor 25 adjusts the focal distance of the light receiver 21 based on a determination result. Several manners are conceived to determine whether or not the reception data Dr are proper. As a simple, easy manner, parity may be added to the modulation signal, and the adjustor 25 may perform parity check for the determination. Alternatively, the adjustor 25 may perform the determination based on data length of the reception data Dr. In other words, if the data length of the reception data Dr is in a predetermined range including the data length of one frame set, the adjustor 25 may determine that the reception data Dr are proper. If the data length of the reception data Dr is longer than the range, the adjustor 25 may determine that the reception data Dr are too long; and if the data length of the reception data Dr is shorter than the range, the adjustor 25 may determine that the reception data Dr are too short.

Figure 28:
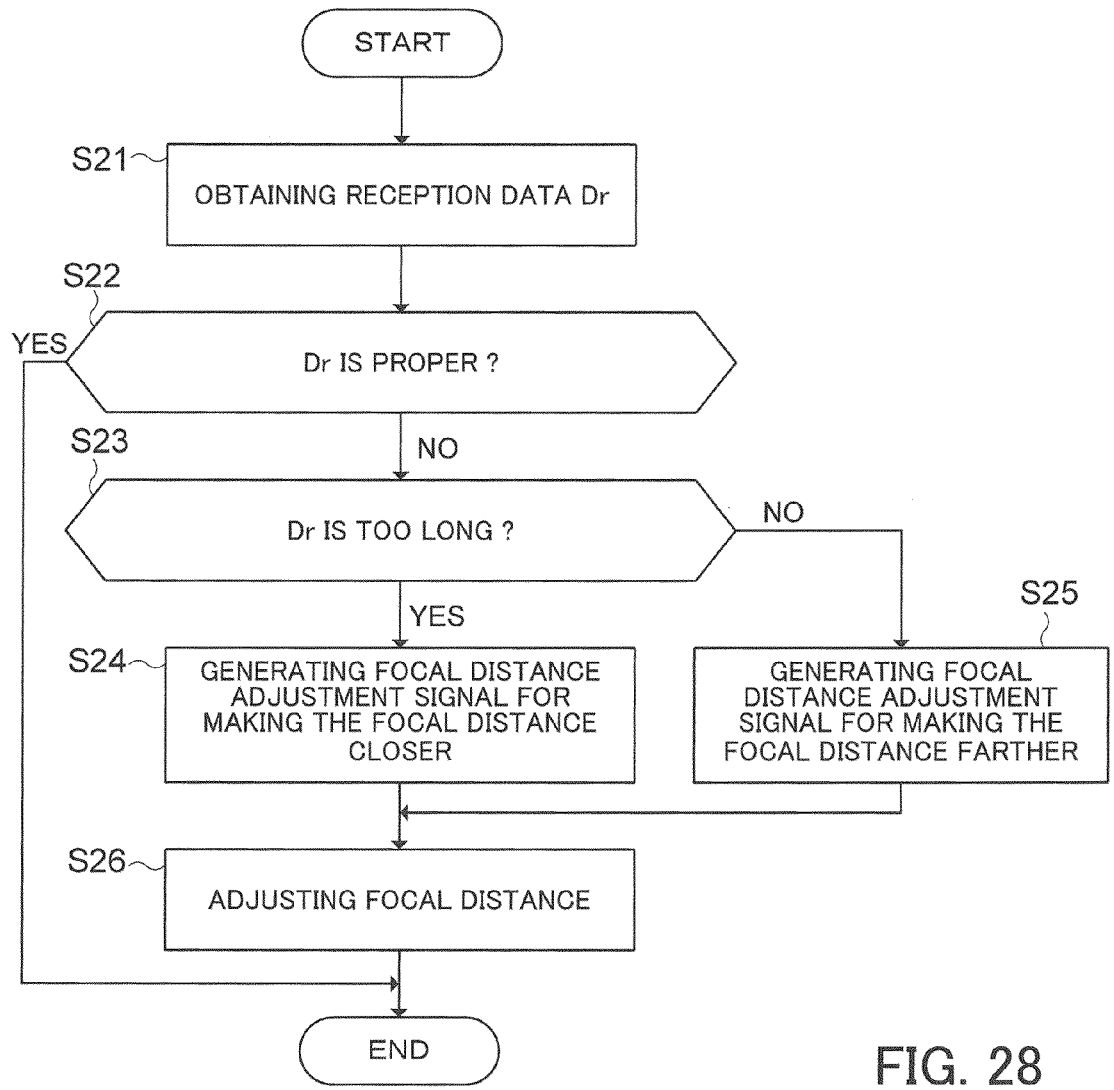
FIG. 28 is a flowchart illustrating an example of processing operations of the adjustor 25.

FIG. 28 is a flowchart illustrating an example of processing operations of the adjustor 25. First, the adjustor 25 obtains the reception data Dr generated by the demodulator 23 (Step S21). Next, the adjustor 25 determines whether or not the reception data Dr are proper (Step S22). If the reception data Dr are proper (YES in Step S22), for example, if the reception data Dr almost correspond to one frame set, the adjustor 25 determines that the focal distance is proper, and thus, the adjustment of the focal distance is not performed.

In the case where the reception data Dr are too long (NO in Step S22 and NO in Step S23), the adjustor 25 generates a focal distance adjustment signal for making the focal distance of the light receiver 21 closer (Step S24).

On the other hand, in the case where the reception data Dr are too short (NO in Step S22 and YES in Step S23), the adjustor 25 generates a focal distance adjustment signal for making the focal distance of the light receiver 21 farther (Step S25).

Next, the adjustor 25 adjusts the focal distance of the light receiver 21 according to the focal distance adjustment signal (Step S26). The above-described feedback operation is repeated, so that the focal distance of the light receiver 21 is properly set.

Figure 29:
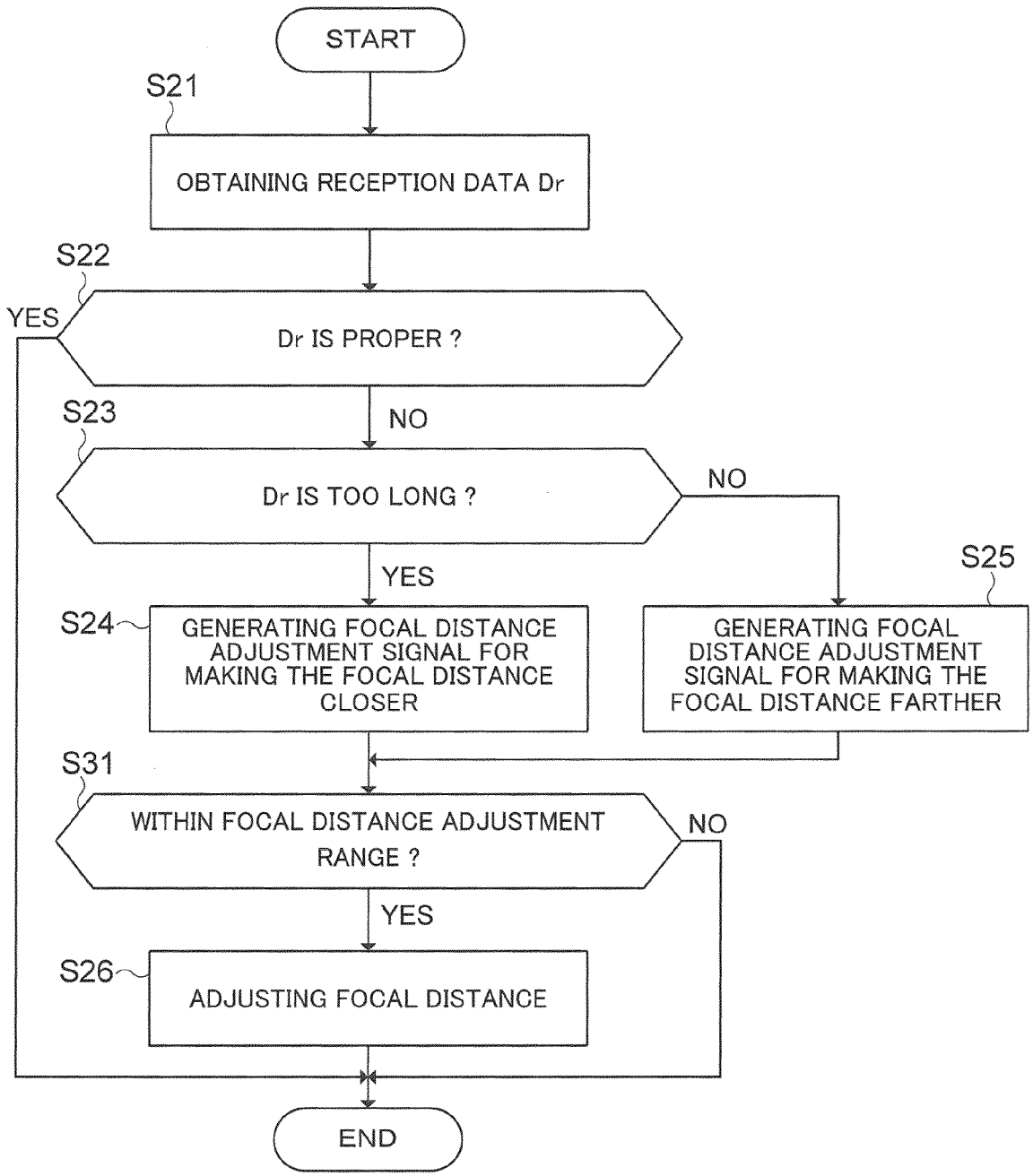
FIG. 29 is a modified example of FIG. 28.

FIG. 29 is a modified example of FIG. 28. After the focal distance adjustment signal is generated, the adjustor 25 determines whether or not the focal distance adjusted according to the focal distance adjustment signal is in an proper focal distance adjusting range of the light receiver 21 (Step S31). Only if the focal distance is in the proper range (YES in Step S31), the adjustor 25 adjusts the focal distance (Step S26).

In this manner, in the sixth embodiment, the adjustor 25 is provided so as to adjust the focal distance of the light receiver 21 according to the reception data Dr. Therefore, the light source 12 can be photographed in an appropriate size, thereby, generating the reception data Dr at a higher accuracy.

Seventh Embodiment

In the above-described sixth embodiment, the adjustor 25 adjusts the focal distance of the light receiver 21. On the contrary, in the below-described seventh embodiment, the adjustor 25 adjusts the pint of the light receiver 21. Note that, the internal configuration of a light receiver according to the embodiment is the same as that of FIG. 27.

Figure 30:
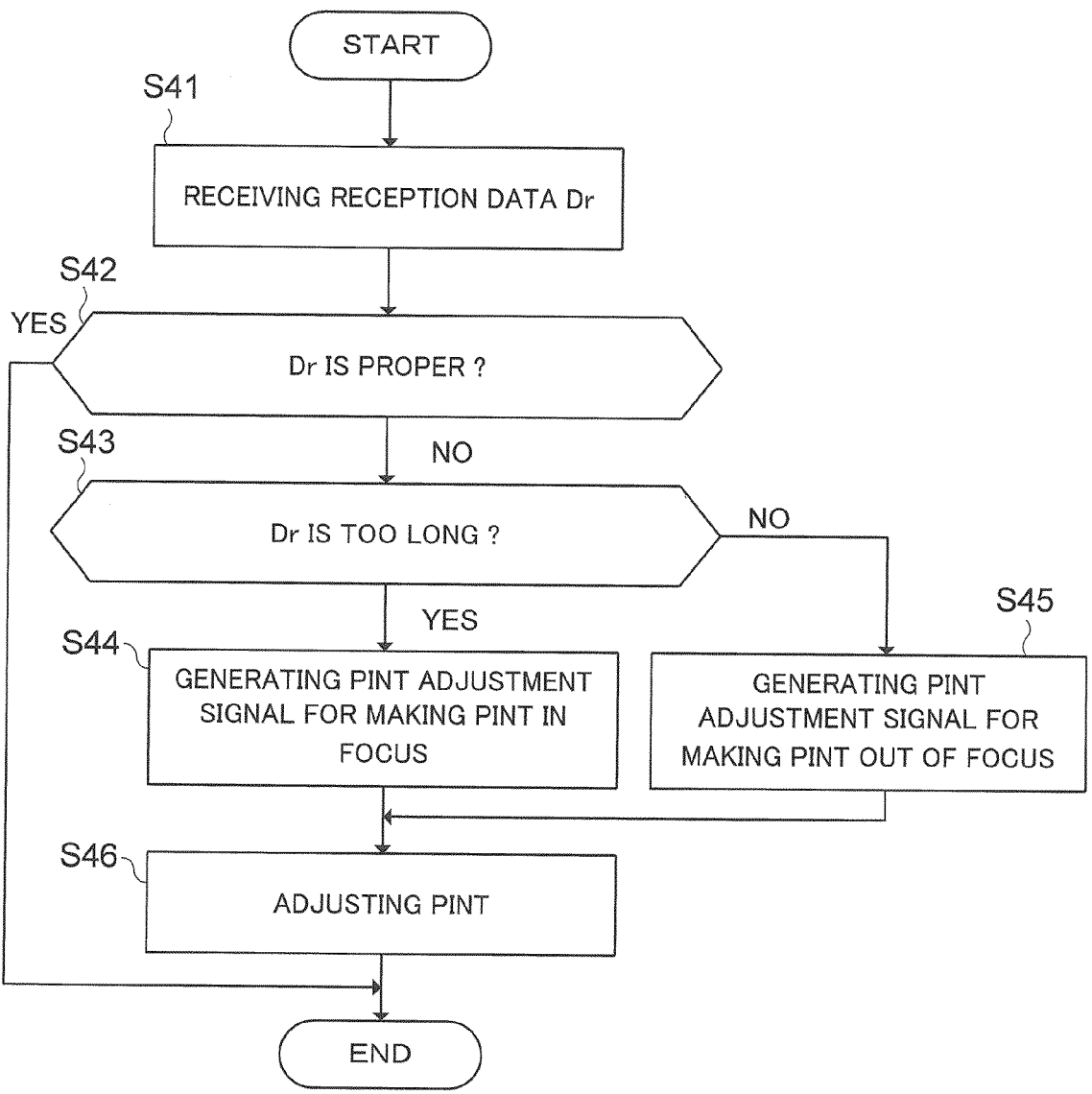
FIG. 30 is a flowchart illustrating an example of processing operations of the adjustor 25.

FIG. 30 is a flowchart illustrating an example of processing operations of the adjustor 25. Steps S41 to S43 of the figure are the same as Steps S21 to S23 of FIG. 28, respectively. If the reception data Dr are proper (YES in Step S42), for example, if the reception data Dr almost correspond to one frame set, the adjustor 25 does not perform pint adjustment.

In the case where the reception data Dr are too long (NO in Step S42 and YES in Step S43), the adjustor 25 generates a pint adjustment signal for making the pint of the light receiver 21 in focus (Step S44).

On the other hand, in the case where the reception data Dr are too short (NO in Step S42 and NO in Step S43) the adjustor 25 generates a pint adjustment signal for making the pint of the light receiver 21 out of focus (Step S45).

Next, the adjustor 25 adjusts the pint of the light receiver 21 according to the pint adjustment signal (Step S46). The above-described feedback operation is repeated, so that the pint of the light receiver 21 is set so that the reception data Dr are proper.

Figure 31:
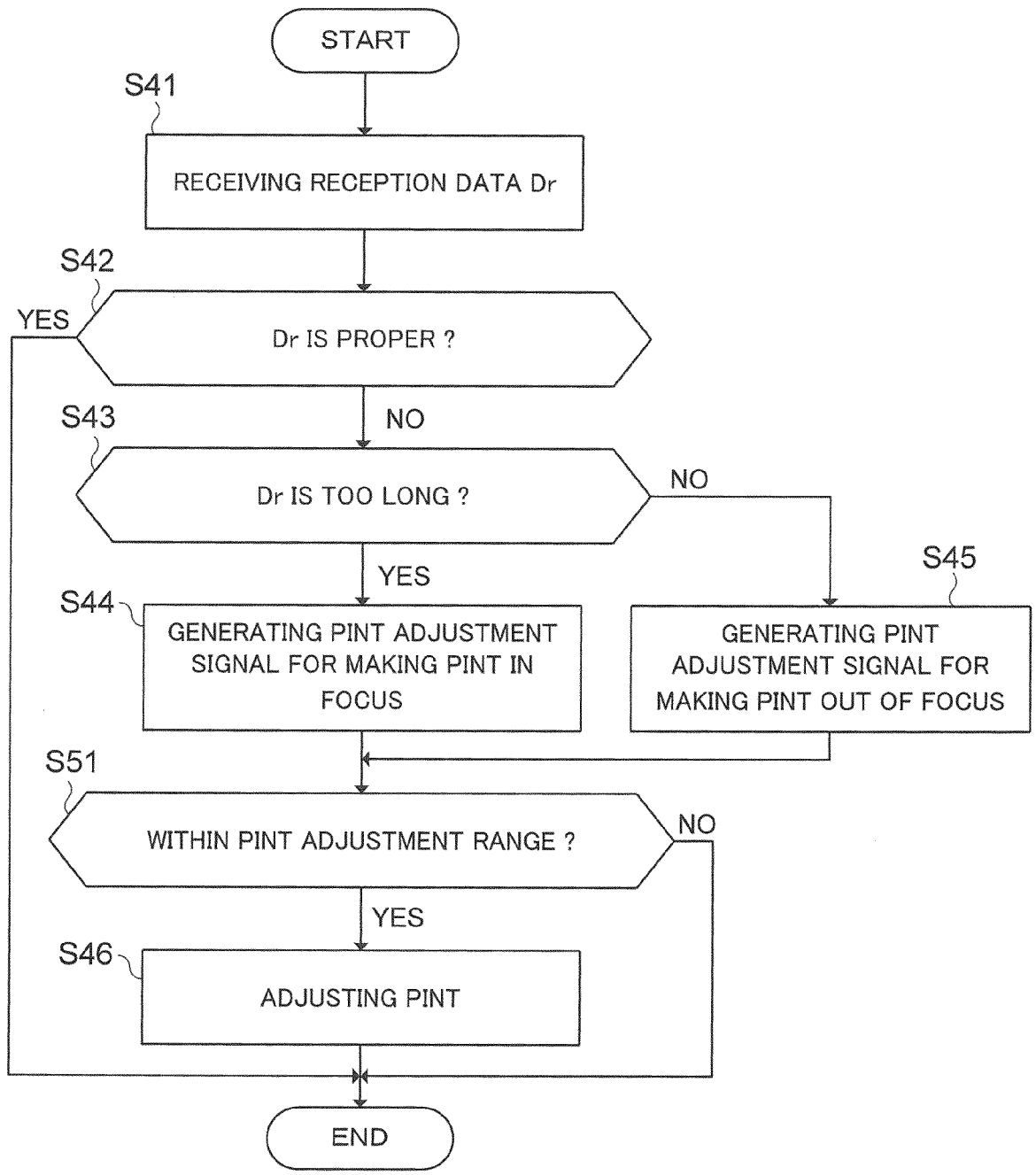
FIG. 31 is a modified example of FIG. 30.

FIG. 31 is a modified example of FIG. 30. After the pint adjustment signal is generated, the adjustor 25 determines whether or not the pint adjusted according to the pint adjustment signal is in an proper pint adjusting range of the light receiver 21 (Step S51). Only if the focus is in the proper range (YES in Step S51), the adjustor 25 adjusts the pint (Step S26).

In this manner, in the seventh embodiment, the adjustor 25 adjusts the pint of the light receiver 21 according to the reception data Dr. Therefore, the light source 12 can be photographed in an appropriate size, thereby, generating the reception data Dr at a higher accuracy.

At least a part of the transmission system explained in the above embodiments can be formed of hardware or software. When the transmission system is partially formed of the software, it is possible to store a program implementing at least a partial function of the transmission system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the transmission system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A transmission system comprising:
a transmitter; and
a receiver,
wherein the transmitter comprises:
  a modulator configured to modulate transmission data at a chip rate to generate a modulation signal; and
  one or a plurality of light sources configured to emit visible light according to the modulation signal,
wherein the receiver comprises:
  a light receiver comprising one or more lines of light receiving elements to receive light in a first range including the visible light; and
  a demodulator configured to demodulate image data generated according to the light received by the light receiver to generate reception data corresponding to the transmission data, and
wherein a following equation (1) is satisfied:

$$ff \leq fm \tag{1}$$

where fm is the chip rate, and ff is a frame rate of the light receiver,
wherein the chip rate is a value based on a unit time of blinking control of the light source, and
wherein the frame rate is a value based on a period of accessing a same line of the light receiver.

2. The system of claim 1,
wherein the demodulator is configured to sample scan lines, a number of the sampled scan lines being an integer near a multiple of p from a first scan line in an area corresponding to the light source from the image data, and combine sampled values to generate the reception data, and
wherein the p is frx/fm, and frx is a line scan frequency of the light receiver.

3. The system of claim 1, wherein the demodulator comprises:
a light source detector configured to detect an area corresponding to the light source from the image data; and
an integrator configured to sample scan lines, a number of the sampled scan lines being an integer near a multiple number of p from a first scan line in the area corresponding to the light source, and combine sampled values to generate the reception data, and
wherein the p is frx/fm, and frx is a line scan frequency of the light receiver.

4. The system of claim 3,
wherein the modulation signal comprises a frame set comprising at least the transmission data and a synchronization signal, the synchronization signal comprising a first pattern, and
wherein the light source detector is configured to detect the area corresponding to the light source by searching the synchronization signal.

5. The system of claim 4, wherein the modulation signal comprises the frame set comprising at least coded transmission data and the synchronization signal, the synchronization signal comprising the first pattern which does not appear in the coded transmission data.

6. The system of claim 4, wherein the modulation signal comprises the frame set comprising at least Manchester-coded transmission data and the synchronization signal, the synchronization signal comprising a Barker sequence of 5 or more.

7. The system of claim 4, wherein the modulation signal comprises the frame set which is repeated a predetermined number of times.

8. The system of claim 7,
wherein the modulation signal comprises the frame set which is repeated by C times, C being the predetermined number,
wherein a following equation (2) is satisfied:

$$C * Tb \geq 1/ff \tag{2}$$

where Tb is a time of the frame set.

9. The system of claim 4, wherein the modulation signal comprises a frame set comprising at least:
the transmission data that is divided,
the synchronization signal, and
determination data comprising identical values added to at least two of a first position before the divided transmission data, a second position within the divided transmission data, and a third position after the divided transmission data, and
wherein the value of the determination data added to one divided transmission data is different from the value of the determination data added to the successive divided transmission data.

10. The system of claim 1, wherein the demodulator comprises:
a candidate area detector configured to detect a candidate area corresponding to the light source from the image data;
a light source detector configured to detect an area corresponding to the light source within the detected candidate area; and
an integrator configured to sample scan lines, a number of the sampled scan lines being an integer near a multiple number of p from a first scan line in the area corresponding to the light source, and combine sampled values to generate the reception data, and
wherein the p is frx/fm, and frx is a line scan frequency of the light receiver.

11. The system of claim 10, wherein the candidate area detector is configured to detect the candidate area based on a density of edges in a direction perpendicular to a scan line or a correlation of luminance in a direction of the scan line in the image data.

12. The system of claim 1, wherein the receiver comprises an adjustor configured to adjust a pint or a focal distance of the light receiver based on the reception data.

13. The system of claim 12, wherein the adjuster is configured:
not to adjust the pint of the light receiver when data length of the reception data is shorter than a first data length and longer than a second data length;
to make the pint of the light receiver in focus, when the data length of the reception data is longer than the first data length; and
to make the pint of the light receiver out of focus when the data length of the reception data is shorter than the second data length.

14. The system of claim 12, wherein the adjuster is configured:
not to adjust the focal distance of the light receiver when data length of the reception data is shorter than a first data length and longer than a second data length;
to make the focal distance of the light receiver closer when the data length of the reception data is longer than the first data length; and
to make the focal distance of the light receiver farther when the data length of the reception data is shorter than the second data length.

15. The system of claim 13,
wherein the modulation signal comprises a frame set comprising at least the transmission data and a synchronization signal, the synchronization signal comprising a first pattern, and
wherein the first data length and the second data length are determined based on data length of the frame set.

16. The system of claim 1,
wherein the modulator is configured to modulate the transmission data at the chip rate which is high enough such that blinking of the visible light according the modulation signal is not recognized by human eyes, and
wherein the frame rate ff is substantially 30 Hz or 60 Hz.

17. The system of claim 1,
wherein the light receiver comprises N lines of light receiving elements, N being an integer of 1 or more, and
wherein the receiver comprises a display configured to display an image corresponding to an entire angle of viewing of image data comprising N lines of scan lines generated according to the light received by the light receiver.

18. A transmitter configured to transmit data to a receiver comprising a light receiver comprising one or more lines of light receiving elements, the transmitter comprises:
a modulator configured to modulate transmission data at a chip rate to generate a modulation signal; and
one or a plurality of light sources configured to emit visible light according to the modulation signal,
wherein a following equation (3) is satisfied:

$$ff < fm \tag{3}$$

where fm is the chip rate, and ff is a frame rate of the light receiver,
wherein the chip rate is a value based on a unit time of blinking control of the light source, and
wherein the frame rate is a value based on a period of accessing a same line of the light receiver.

19. A receiver configured to receive data from a transmitter comprising a modulator configured to modulate transmission data at a chip rate to generate a modulation signal; and one or a plurality of light sources configured to emit visible light according to the modulation signal, the receiver comprising:
a light receiver comprising one or more lines of light receiving elements to receive light in a first range including the visible light; and
a demodulator configured to demodulate image data generated according to the light received by the light receiver to generate reception data corresponding to the transmission data,
wherein a following equation (4) is satisfied:

$$ff < fm \tag{4}$$

where fm is the chip rate, and ff is a frame rate of the light receiver,
wherein the chip rate is a value based on a unit time of blinking control of the light source, and
wherein the frame rate is a value based on a period of accessing a same line of the light receiver.

20. The receiver of claim 19,
wherein the demodulator is configured to sample scan lines, a number of the sampled scan lines being an integer near a multiple of p from a first scan line in an area corresponding to the light source from the image data, and combine sampled values to generate the reception data, and
wherein the p is frx/fm, and frx is a line scan frequency of the light receiver.

* * * * *